(12) United States Patent
Knights

(10) Patent No.: US 6,504,525 B1
(45) Date of Patent: Jan. 7, 2003

(54) ROTATING ELEMENT SHEET MATERIAL WITH MICROSTRUCTURED SUBSTRATE AND METHOD OF USE

(75) Inventor: John Christopher Knights, Soquel, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/563,504

(22) Filed: May 3, 2000

(51) Int. Cl.[7] ................................................ G09G 3/34
(52) U.S. Cl. .................... 345/107; 345/108; 359/296
(58) Field of Search .................... 345/84, 105, 107, 345/108; 359/296, 541; 156/276; 264/8

(56) References Cited

U.S. PATENT DOCUMENTS

| | | | |
|---|---|---|---|
| 2,326,634 A | 8/1943 | Gebhard et al. | 88/82 |
| 2,354,018 A | 7/1944 | Heltzer et al. | 88/82 |
| 2,354,048 A | 7/1944 | Plamquist | 40/135 |
| 2,354,049 A | 7/1944 | Palmquist | 40/135 |
| 2,407,680 A | 9/1946 | Palmquist et al. | 88/82 |
| 2,600,963 A | 6/1952 | Bland | 49/58 |
| 2,684,788 A | 7/1954 | Bland | 222/177 |
| 2,794,301 A | 6/1957 | Law et al. | 49/84 |
| 2,950,985 A | 8/1960 | d'Adrian | 117/33 |
| 2,965,921 A | 12/1960 | Bland | 18/2.5 |
| 2,980,547 A | 4/1961 | d'Adrian | 106/47 |
| 3,036,388 A | 5/1962 | Tate | 35/66 |
| 3,063,388 A | 11/1962 | Magarian et al. | 105/376 |
| 3,150,947 A | 9/1964 | Bland | 65/21 |
| 3,222,204 A | 12/1965 | Weber et al. | 117/27 |
| 3,243,273 A | 3/1966 | Bland | 65/21 |
| 3,310,391 A | 3/1967 | Law | 65/21 |
| 3,406,363 A | 10/1968 | Tate | 335/302 |
| 3,594,065 A | 7/1971 | Marks | 350/160 |
| 3,615,993 A | 10/1971 | French | 156/155 |
| 3,617,333 A | 11/1971 | Brown | 117/35 |
| 3,648,281 A | 3/1972 | Dahms et al. | 340/373 |
| 3,795,435 A | 3/1974 | Schwab | 350/105 |

(List continued on next page.)

FOREIGN PATENT DOCUMENTS

| | | |
|---|---|---|
| WO | WO 98/03896 | 1/1998 |
| WO | WO 98/41899 | 9/1998 |
| WO | WO 99/10767 | 3/1999 |

OTHER PUBLICATIONS

"Xerox PARC and 3M to collaborate on electronic paper," Information Today, vol. 16, No. 8, Sep. 1999.

(List continued on next page.)

Primary Examiner—Lun-Yi Lao
Assistant Examiner—Tom V. Sheng
(74) Attorney, Agent, or Firm—Finnegan, Henderson, Farabow, Garrett & Dunner, L.L.P.

(57) ABSTRACT

Systems in one embodiment of the present invention comprise rotating element sheet material with a microstructured substrate component, and a method of assembling such rotating element sheet material. A first embodiment of the present invention comprises a substrate, enabling fluid, a plurality of rotatable elements of a first class, and a plurality of rotatable elements of a second class, where the substrate comprises a cavity-containing matrix having a plurality of cavities of a first class and a plurality of cavities of a second class, where the plurality of rotatable elements of a first class are disposed within the plurality of cavities of a first class, and the plurality of rotatable elements of a second class are disposed within the plurality of cavities of a second class, and where the plurality of cavities of a first class and the plurality of cavities of a second class are arranged in a regular, repeating pattern in a substantially single layer, or alternatively, the plurality of cavities of a first class and the plurality of cavities of a second class are arranged to define macroscopic regions displaying common aspects. A further embodiment of the present invention includes a method of macroscopically addressing rotating element sheet material.

12 Claims, 16 Drawing Sheets

U.S. PATENT DOCUMENTS

| | | | |
|---|---|---|---|
| 3,915,771 A | 10/1975 | Gatzke et al. | 156/71 |
| 3,982,334 A | 9/1976 | Tate | 35/66 |
| 4,001,140 A | 1/1977 | Foris et al. | 252/316 |
| 4,002,022 A | 1/1977 | Lopez | 58/126 |
| 4,082,426 A | 4/1978 | Brown | 350/105 |
| RE29,742 E | 8/1978 | Tung | 2/412 |
| 4,117,192 A | 9/1978 | Jorgensen | 428/337 |
| 4,117,194 A | 9/1978 | Barbe et al. | 428/374 |
| 4,126,854 A | 11/1978 | Sheridon | 340/373 |
| 4,143,103 A | 3/1979 | Sheridon | 264/4 |
| 4,143,472 A | 3/1979 | Murata et al. | 35/66 |
| 4,229,732 A | 10/1980 | Hartstein et al. | 340/378.2 |
| 4,232,084 A | 11/1980 | Tate | 428/309 |
| 4,253,909 A | 3/1981 | Lee | 156/654 |
| 4,256,677 A | 3/1981 | Lee | 264/8 |
| 4,261,653 A | 4/1981 | Goodrich | 350/362 |
| 4,267,946 A | 5/1981 | Thatcher | 222/345 |
| 4,268,413 A | 5/1981 | Dabisch | 252/408 |
| 4,273,672 A | 6/1981 | Vassiliades | 252/316 |
| 4,283,438 A | 8/1981 | Lee | 427/47 |
| 4,288,788 A | 9/1981 | Rogers et al. | 340/378.2 |
| 4,299,880 A | 11/1981 | Arens | 428/304 |
| 4,367,920 A | 1/1983 | Tung et al. | 350/105 |
| 4,368,952 A | 1/1983 | Murata et al. | 350/362 |
| 4,374,889 A | 2/1983 | Arens | 428/207 |
| 4,381,616 A | 5/1983 | Saxer | 40/502 |
| 4,402,062 A | 8/1983 | Batchelder | 365/153 |
| 4,411,973 A | 10/1983 | Gilmour et al. | 430/7 |
| 4,417,543 A | 11/1983 | Lee | 118/620 |
| 4,418,098 A | 11/1983 | Maistrovich | 427/161 |
| 4,418,346 A | 11/1983 | Batchelder | 340/787 |
| 4,419,383 A | 12/1983 | Lee | 427/47 |
| 4,438,160 A | 3/1984 | Ishikawa et al. | 427/214 |
| 4,441,791 A | 4/1984 | Hornbeck | 350/360 |
| 4,457,723 A | 7/1984 | Tate | 434/409 |
| 4,492,435 A | 1/1985 | Banton et al. | 350/360 |
| 4,500,172 A | 2/1985 | Gagnon et al. | 350/331 R |
| 4,511,210 A * | 4/1985 | Tung et al. | 359/541 |
| 4,532,608 A | 7/1985 | Wu | 365/127 |
| 4,569,857 A | 2/1986 | Tung et al. | 427/163 |
| 4,592,628 A | 6/1986 | Altman et al. | 350/486 |
| 4,627,689 A | 12/1986 | Asher | 350/362 |
| 4,632,517 A | 12/1986 | Asher | 350/362 |
| 4,675,476 A | 6/1987 | Kobayashi | 178/18 |
| 4,678,695 A | 7/1987 | Tung et al. | 428/120 |
| 4,688,900 A | 8/1987 | Doane et al. | 350/347 |
| 4,695,528 A | 9/1987 | Dabisch et al. | 430/290 |
| 4,710,732 A | 12/1987 | Hornbeck | 332/7.51 |
| 4,713,295 A | 12/1987 | Laroche | 428/406 |
| 4,721,649 A | 1/1988 | Belisle et al. | 428/325 |
| 4,725,494 A | 2/1988 | Belisle et al. | 428/325 |
| 4,729,687 A | 3/1988 | Arens | 401/198 |
| 4,740,266 A | 4/1988 | Wu | 156/633 |
| 4,781,789 A | 11/1988 | Wu | 156/633 |
| 4,781,790 A | 11/1988 | Wu | 156/633 |
| 4,783,236 A | 11/1988 | Wu | 156/633 |
| 4,795,243 A | 1/1989 | Suzuki | 350/362 |
| 4,795,528 A | 1/1989 | Wu | 156/633 |
| 4,810,431 A | 3/1989 | Leidner | 264/15 |
| 4,837,071 A | 6/1989 | Tagoku et al. | 428/195 |
| 4,877,253 A | 10/1989 | Arens | 273/240 |
| 4,890,902 A | 1/1990 | Doane et al. | 350/347 |
| 4,919,521 A | 4/1990 | Tada et al. | 350/362 |
| 4,931,019 A | 6/1990 | Park | 434/409 |
| 4,948,232 A | 8/1990 | Lange | 350/334 |
| 4,956,619 A | 9/1990 | Hornbeck | 330/4.3 |
| 4,991,941 A | 2/1991 | Kalmanash | 350/347 |
| 4,994,204 A | 2/1991 | Doane et al. | 252/299.01 |
| 5,039,557 A | 8/1991 | White | 427/137 |
| 5,066,559 A | 11/1991 | Elmasry et al. | 430/111 |
| 5,075,186 A | 12/1991 | Sheridon | 430/47 |
| 5,128,203 A | 7/1992 | LaRoche | 428/325 |
| 5,131,736 A | 7/1992 | Alvarez | 359/886 |
| 5,151,032 A | 9/1992 | Igawa | 434/409 |
| 5,155,607 A | 10/1992 | Inoue et al. | 359/51 |
| 5,157,011 A | 10/1992 | Okabe et al. | 503/201 |
| 5,189,658 A | 2/1993 | Moses | 369/100 |
| 5,219,820 A | 6/1993 | Morohoshi et al. | 503/204 |
| 5,223,473 A | 6/1993 | Oliver et al. | 503/226 |
| 5,226,099 A | 7/1993 | Mignardi et al. | 385/19 |
| 5,233,459 A | 8/1993 | Bozler et al. | 359/230 |
| 5,249,000 A | 9/1993 | Okabe et al. | 346/151 |
| 5,251,048 A | 10/1993 | Doane et al. | 359/51 |
| 5,262,098 A | 11/1993 | Crowley et al. | 264/8 |
| 5,262,374 A | 11/1993 | Okabe et al. | 503/201 |
| 5,270,872 A | 12/1993 | Spry | 359/885 |
| 5,274,460 A | 12/1993 | Yamada et al. | 358/296 |
| 5,290,066 A | 3/1994 | Mody | 281/15.1 |
| 5,315,418 A | 5/1994 | Sprague et al. | 359/41 |
| 5,315,776 A | 5/1994 | Strawbridge et al. | 40/505 |
| 5,331,454 A | 7/1994 | Hornbeck | 359/224 |
| 5,344,594 A | 9/1994 | Sheridon | 264/4.1 |
| 5,351,995 A | 10/1994 | Booker | 283/117 |
| 5,354,598 A | 10/1994 | Arens | 428/195 |
| 5,363,222 A | 11/1994 | Ledebuhr | 359/40 |
| 5,383,008 A | 1/1995 | Sheridon | 355/256 |
| 5,384,067 A | 1/1995 | Doane et al. | 252/299.01 |
| 5,389,426 A | 2/1995 | Arens et al. | 428/195 |
| 5,389,945 A | 2/1995 | Sheridon | 345/85 |
| 5,397,503 A | 3/1995 | Yuasa et al. | 252/299.01 |
| 5,411,398 A | 5/1995 | Nakanishi et al. | 434/409 |
| 5,416,996 A | 5/1995 | Clemens et al. | 40/502 |
| 5,432,526 A | 7/1995 | Hyatt | 345/87 |
| 5,432,534 A | 7/1995 | Maruyama et al. | 347/172 |
| 5,459,602 A | 10/1995 | Sampsell | 359/234 |
| 5,469,020 A | 11/1995 | Herrick | 313/511 |
| 5,515,075 A | 5/1996 | Nakagiri et al. | 345/111 |
| 5,526,016 A | 6/1996 | Nakagiri et al. | 345/111 |
| 5,535,047 A | 7/1996 | Hornbeck | 359/295 |
| 5,582,700 A | 12/1996 | Bryning et al. | 204/450 |
| 5,604,027 A | 2/1997 | Sheridon | 428/323 |
| 5,627,562 A | 5/1997 | Skodlar | 345/111 |
| 5,659,330 A | 8/1997 | Sheridon | 345/84 |
| 5,667,924 A | 9/1997 | Ziolo | 430/39 |
| 5,703,671 A | 12/1997 | Narita et al. | 355/32 |
| 5,708,525 A | 1/1998 | Sheridon | 359/296 |
| 5,717,283 A | 2/1998 | Biegelsen et al. | 313/483 |
| 5,717,514 A | 2/1998 | Sheridon | 359/296 |
| 5,717,515 A | 2/1998 | Sheridon | 359/296 |
| 5,723,204 A | 3/1998 | Stefik | 428/206 |
| 5,724,064 A | 3/1998 | Stefik et al. | 345/105 |
| 5,731,792 A | 3/1998 | Sheridon | 345/84 |
| 5,737,115 A * | 4/1998 | Mackinlay et al. | 359/296 |
| 5,739,801 A | 4/1998 | Sheridon | 345/84 |
| 5,739,946 A | 4/1998 | Iwanaga et al. | 359/296 |
| 5,751,268 A | 5/1998 | Sheridon | 345/107 |
| 5,754,332 A | 5/1998 | Crowley | 359/296 |
| 5,757,345 A | 5/1998 | Sheridon | 345/84 |
| 5,760,761 A | 6/1998 | Sheridon | 345/107 |
| 5,767,826 A | 6/1998 | Sherdon et al. | 345/84 |
| 5,777,782 A | 7/1998 | Sheridon | 359/296 |
| 5,784,189 A | 7/1998 | Bozler et al. | 359/254 |
| 5,808,593 A | 9/1998 | Sheridon | 345/84 |
| 5,808,783 A | 9/1998 | Crowley | 359/296 |
| 5,815,306 A | 9/1998 | Sheridon et al. | 359/296 |
| 5,821,624 A | 10/1998 | Pasch | 257/776 |
| 5,825,529 A | 10/1998 | Crowley | 359/296 |
| 5,828,441 A | 10/1998 | Narita et al. | 355/32 |
| 5,866,284 A | 2/1999 | Vincent | 430/37 |
| 5,869,929 A | 2/1999 | Eida et al. | 313/501 |
| 5,877,844 A | 3/1999 | Matsumoto | 355/35 |

| | | | |
|---|---|---|---|
| 5,891,479 A | 4/1999 | Sheridon | 425/8 |
| 5,892,497 A | 4/1999 | Robertson | 345/107 |
| 5,893,206 A | 4/1999 | Furlani et al. | 29/608 |
| 5,894,367 A | 4/1999 | Sheridon | 359/623 |
| 5,900,192 A | 5/1999 | Richley | 264/8 |
| 5,900,858 A | 5/1999 | Richley | 345/107 |
| 5,904,790 A | 5/1999 | Sheridon | 156/83 |
| 5,906,743 A | 5/1999 | Cohen et al. | 210/502.1 |
| 5,914,805 A | 6/1999 | Crowley | 359/296 |
| 5,917,646 A | 6/1999 | Sheridon | 359/296 |
| 5,919,409 A * | 7/1999 | Sheridon | 264/8 |
| 5,922,268 A | 7/1999 | Sheridon | 264/437 |
| 5,930,026 A | 7/1999 | Jacobson et al. | 359/296 |
| 5,940,054 A | 8/1999 | Harris | 345/85 |
| 5,956,005 A | 9/1999 | Sheridon | 345/84 |
| 5,961,804 A | 10/1999 | Jacobson et al. | 204/606 |
| 5,969,472 A | 10/1999 | Kisner | 313/484 |
| 5,974,901 A | 11/1999 | Zborowski et al. | 73/865.5 |
| 5,975,680 A | 11/1999 | Wen et al. | 347/43 |
| 5,976,428 A | 11/1999 | Richley | 264/10 |
| 5,982,346 A | 11/1999 | Sheridon et al. | 345/85 |
| 5,986,629 A | 11/1999 | Smith et al. | 345/84 |
| 5,989,629 A | 11/1999 | Sacripante et al. | 427/180 |
| 6,014,116 A | 1/2000 | Haynes et al. | 345/1 |
| 6,014,247 A | 1/2000 | Winter et al. | 359/296 |
| 6,017,584 A | 1/2000 | Albert et al. | 427/213.3 |
| 6,034,807 A | 3/2000 | Little et al. | 359/227 |
| 6,038,059 A | 3/2000 | Silverman | 359/296 |
| 6,054,071 A | 4/2000 | Mikkelsen, Jr. | 264/1.36 |
| 6,054,809 A | 4/2000 | Haynes et al. | 313/505 |
| 6,055,091 A | 4/2000 | Sheridon et al. | 359/296 |
| 6,067,185 A | 5/2000 | Albert et al. | 359/296 |
| 6,072,621 A | 6/2000 | Kishi et al. | 359/296 |
| 6,110,538 A | 8/2000 | Sheridon | 427/457 |
| 6,118,419 A | 9/2000 | Smith et al. | 345/84 |
| 6,120,588 A | 9/2000 | Jacobson | 106/31.16 |
| 6,120,839 A | 9/2000 | Comiskey et al. | 427/213.3 |
| 6,122,094 A | 9/2000 | Silverman | 359/296 |
| 6,128,124 A | 10/2000 | Silverman | 359/296 |
| 6,130,773 A | 10/2000 | Jacobson et al. | 359/296 |
| 6,137,467 A | 10/2000 | Sheridon et al. | 345/107 |
| 6,147,791 A | 11/2000 | Sheridon | 359/296 |
| 6,162,321 A * | 12/2000 | Silverman | 156/276 |
| RE37,085 E | 3/2001 | Sheridon | 428/323 |
| 6,174,153 B1 | 3/2001 | Sheridon | 425/3 |
| 6,197,228 B1 | 3/2001 | Sheridon | 264/1.36 |
| 6,211,998 B1 | 4/2001 | Sheridon | 359/296 |
| 6,097,531 A1 | 8/2001 | Sheridon | 359/296 |

OTHER PUBLICATIONS

Gibbs, "The Reinvention of Paper," Scientific American: Technology and Business, Sep. 1998.

Mattis, "Screen Saviors," Business 2.0, Jul. 1999.

Mann, "Who will own your next good idea?" The Atlantic Monthly, Sep. 1998, vol. 282, pp. 57–82.

Comiskey et al., "An electrophoretic ink for all–printed reflective electronic displays," Nature, Jul. 16, 1998, vol. 394, pp. 253–255.

Klein, "Will the future be written in E–Ink?" The Wall Street Journal, Jan. 4, 2000.

Wisnieff, "Printing Screens," Nature, Jul. 16, 1988, vol. 394, Issue No. 6690, pp. 225 and 227.

L.L. Lee, "A Magnetic–Particles Display," IEEE Transactions on Electron Devices, vol. ED–22, No. 9, Sep. 1975, pp. 758–765.

L.L. Lee, "Fabrication of Magnetic Particles Displays," Proceeding of the S.I.D., vol. 18/3 & 4 1977, pp. 283–288.

* cited by examiner

ROTATING ELEMENT SHEET MATERIAL WITH MICROSTRUCTURED SUBSTRATE AND METHOD OF USE

RELATED APPLICATIONS

The following identified United States patent applications are relied upon and are fully incorporated herein by reference:

U.S. patent application entitled "System and method for rotatable element assembly and laminate substrate assembly," by David K. Biegelsen, Joseph, M. Crowley, and Alexander E. Silverman, filed on Dec. 17, 1999, and accorded Ser. No. 09/465,801.

U.S. patent application entitled "Rotating element sheet material with generalized containment structure," by Nicholas K. Sheridon, filed on Apr. 14, 2000, and accorded Ser. No. 09/549,518.

U.S. patent application entitled "Rotating element sheet material with reversible highlighting," by Alexander E. Silverman, filed on Mar. 2, 2000, and accorded Ser. No. 09/517,522.

FIELD OF INVENTION

The present invention relates to rotating element sheet material, a method of assembly of such rotating element sheet material, and a method of macroscopically addressing rotating element sheet material. More particularly, the present invention relates to rotating element sheet material that allows for the assignment of rotatable elements of specified classes to specified positions.

BACKGROUND OF THE INVENTION

Rotating element sheet material has been disclosed in U.S. Pat. Nos. 4,126,854 and 4,143,103, both herein incorporated by reference, and generally comprises a substrate, an enabling fluid, and a class of rotatable elements. As discussed more below, rotating element sheet material has found a use as "reusable electric paper." FIG. 1 depicts an enlarged section of rotating element sheet material 18, including rotatable element 10, enabling fluid 12, cavity 14, and substrate 16. Observer 28 is also shown. Although FIG. 1 depicts a spherically shaped rotatable element and cavity, many other shapes will work and are consistent with the present invention. As disclosed in U.S. Pat. No. 5,389,945, herein incorporated by reference, the thickness of substrate 16 may be of the order of hundreds of microns, and the dimensions of rotatable element 10 and cavity 14 may be of the order of 10 to 100 microns.

In FIG. 1, substrate 16 is an elastomer material, such as silicone rubber, that accommodates both enabling fluid 12 and the class of rotatable elements within a cavity or cavities disposed throughout substrate 16. The cavity or cavities contain both enabling fluid 12 and the class of rotatable elements such that rotatable element 10 is in contact with enabling fluid 12 and at least one translational degree of freedom of rotatable element 10 is restricted. The contact between enabling fluid 12 and rotatable element 10 breaks a symmetry of rotatable element 10 and allows rotatable element 10 to be addressed. The state of broken symmetry of rotatable element 10, or addressing polarity, can be the establishment of an electric dipole about an axis of rotation. For example, it is well known that small particles in a dielectric liquid acquire an electrical charge that is related to the Zeta potential of the surface coating. Thus, an electric dipole can be established on a rotatable element in a dielectric liquid by the suitable choice of coatings applied to opposing surfaces of the rotatable element.

The use of rotating element sheet material 18 as "reusable electric paper" is due to the fact that the rotatable elements are typically given a second broken symmetry, a multivalued aspect, correlated with the addressing polarity discussed above. That is, the above mentioned coatings may be chosen so as to respond to incident electromagnetic energy in distinguishable ways. Thus, the aspect of rotatable element 10 to observer 28 favorably situated can be controlled by an applied vector field.

For example, as disclosed in U.S. Pat. No. 4,126,854, hereinabove incorporated by reference, rotatable element 10 may comprise a black polyethylene generally spherical body with titanium oxide sputtered on one hemisphere, where the titanium oxide provides a light-colored aspect in one orientation. Such a rotatable element in a transparent dielectric liquid will exhibit the desired addressing polarity as well as the desired aspect.

Rotatable Elements with Two-valued Aspects

A multivalued aspect in its simplest form is a two-valued aspect. When the aspect is the chromatic response to visible light, rotatable element 10 with a two-valued aspect can be referred to as a bichromal rotatable element. Such a rotatable element is generally fabricated by the union of two layers of material as described in U.S. Pat. No. 5,262,098, herein incorporated by reference.

FIGS. 2–4 depict rotatable element 10 and an exemplary system that use such rotatable elements of the prior art. In FIG. 2, rotatable element 10 is composed of first layer 20 and second layer 22 and is, by way of example again, a generally spherical body. The surface of first layer 20 has first coating 91 at a first Zeta potential, and the surface of second layer 22 has second coating 93 at a second Zeta potential. First coating 91 and second coating 93 are chosen such that, when in contact with a dielectric fluid (not shown), first coating 91 has a net positive electric charge with respect to second coating 93. This is depicted in FIG. 2 by the "+" and "−" symbols respectively. Furthermore, the combination of first coating 91 and the surface of first layer 20 is non-white-colored, indicated in FIG. 2 by hatching, and the combination of second coating 93 and the surface of second layer 22 is white-colored. One skilled in the art will appreciate that the material associated with first layer 20 and first coating 91 may be the same. Likewise, the material associated with second layer 22 and second coating 93 may be the same.

FIG. 3 depicts no-field set 30. No-field set 30 is a subset of randomly oriented rotatable elements in the vicinity of vector field 24 when vector field 24 has zero magnitude. Vector field 24 is an electric field. No-field set 30, thus, contains rotatable elements with arbitrary orientations with respect to each other. Therefore, observer 28 in the case of no-field set 30 registers views of the combination of second coating 93 and the surface of second layer 22, and first coating 91 and the surface of first layer 20 in an unordered sequence. Infralayer 26 forms the backdrop of the aspect. Infralayer 26 can consist of any type of material or aspect source, including but not limited to other rotatable elements, or some material that presents a given aspect to observer 28.

FIG. 4 depicts first aspect set 32. First aspect set 32 is a subset of rotatable elements in the vicinity of vector field 24 when the magnitude of vector field 24 is nonzero and has the orientation indicated by arrow 25. In first aspect set 32, all of the rotatable elements orient themselves with respect to arrow 25 due to the electrostatic dipole present on each rotatable element 10. In contrast to no-field set 30, observer 28 in the case of first aspect set 32 registers a view of a set of rotatable elements ordered with the non-white-colored side up. Again, infralayer 26 forms the backdrop of the aspect. An alternate view of first aspect set 32 of FIG. 4 is depicted in FIG. 5. In FIG. 5, the symbol Θ indicates an arrow directed out of the plane of the figure. In FIGS. 4 and 5, rotatable element 10, under the influence of applied vector field 24, orients itself with respect to vector field 24 due to the electric charges present as a result of first coating 91 and second coating 93, as depicted in FIG. 2.

One skilled in the art will appreciate that first aspect set 32 will maintain its aspect after applied vector field 24 is removed, in part due to the energy associated with the attraction between rotatable element 10 and the substrate structure, as, for example, cavity walls (not shown). This energy contributes, in part, to the switching characteristics and the memory capability of rotating element sheet material 18, as disclosed in U.S. Pat. No. 4,126,854, hereinabove incorporated by reference, and discussed in more detail below.

Rotatable Elements with Multivalued Aspect

A rotatable element with multivalued aspect is generally fabricated as disclosed in U.S. Pat. No. 5,919,409, herein incorporated by reference. An exemplary rotatable element 10 with multivalued aspect is depicted in FIG. 6. Rotatable element 10 in FIG. 6 is composed of first layer 36, second layer 37 and third layer 38. The surface of third layer 38 has third coating 95 at a first Zeta potential, and the surface of first layer 36 has first coating 97 at a second Zeta potential such that third coating 95 has a net positive charge, "+," with respect to first coating 97 when rotatable element 10 is in contact with a dielectric fluid (not shown). First layer 36, first coating 97, third layer 38, and third coating 95 can be chosen to be transparent to visible light and second layer 22 can be chosen to be opaque or transparent-colored to visible light, such that the rotatable element acts as a "light-valve," as disclosed, for example, in U.S. Pat. No. 5,767,826, herein incorporated by reference, and in U.S. Pat. No. 5,737,115, herein incorporated by reference. As above, one skilled in the art will appreciate that the material associated with first layer 36 and first coating 97 may be the same. Likewise, the material associated with third layer 38 and third coating 95 may be the same.

Rotatable elements with multivalued aspect are generally utilized in rotating element sheet material that use canted vector fields for addressing. A canted vector field is a field whose orientation vector in the vicinity of a subset of rotatable elements can be set so as to point in any direction in three-dimensional space. U.S. Pat. No. 5,717,515, herein incorporated by reference, discloses the use of canted vector fields in order to address rotatable elements. The use of canted vector fields with rotating element sheet material 18 allows complete freedom in addressing the orientation of a subset of rotatable elements, where the rotatable elements have the addressing polarity discussed above.

One skilled in the art will appreciate that no-field set 30 and first aspect set 32 discussed above in FIGS. 3–5 can form the elements of a pixel, where vector field 24 can be manipulated on a pixel by pixel basis using an addressing scheme as discussed, for example, in U.S. Pat. No. 5,717, 515, hereinabove incorporated by reference.

Work Function

As discussed above, a useful property of rotating element sheet material 18 is the ability to maintain a given aspect after the applied vector field 24 for addressing is removed. This ability contributes, in part, to the switching characteristics and the memory capability of rotating element sheet material 18, as disclosed in U.S. Pat. No. 4,126,854, hereinabove incorporated by reference. This will be referred to as aspect stability. The mechanism for aspect stability in the above embodiments is generally the energy associated with the attraction between the rotatable elements and the substrate structure, or "work function." A host of factors influence the magnitude of the energy associated with the work function including, but not limited to: surface tension of enabling fluid in contact with first rotatable element or second rotatable element; the relative specific gravity of the rotatable elements to the enabling fluid; magnitude of charge on rotatable elements in contact with substrate structure, as, for example, cavity walls; relative electronic permittivity of enabling fluid and substrate structure; "stickiness" of substrate structure; and other residual fields that may be present. The applied vector field 24 for addressing must be strong enough to overcome the work function in order to cause an orientation change; furthermore, the work function must be strong enough to maintain this aspect in the absence of an applied vector field 24 for addressing.

FIG. 7 depicts an exemplary graph of number 54, N, of rotatable elements that change orientation as a function of applied vector field 24, V of the prior art. Work function 52, $V_W$, corresponds to the magnitude of applied vector field 24 when the number 54 of rotatable elements that change orientation in response to vector field 24 has reached saturation level 56, $N_S$, corresponding to the correlated orientation of all rotatable elements 10.

Microstructured Substrate

A desired property of rotatable element sheet material 18 is a high overall ratio of aspect area to surface area. With respect to chromatic aspects, this can be related to overall reflectance or transmittance. Reflectance of ordinary paper is approximately 85%. Reflectance of currently available electric paper is approximately 15% to 20%. U.S. Pat. No. 5,808,783, herein incorporated by reference, discloses a method of improving this value through the use of a dense monolayer of rotatable elements. Often, the arrangement of a dense monolayer is dependent upon the geometry of the substrate. Thus, it remains desirable to fabricate substrate 16 such that it can accommodate a dense monolayer of rotatable elements.

A further desired property of rotating element sheet material is the placement of rotatable elements of different classes to precise positions within the substrate, such that the rotatable elements of given classes are in a regular, repeating pattern in a substantially single layer, and such that the regular, repeating pattern is correlated with an addressing array. In this way, rotatable elements of a given class are located proximal to the corresponding addressing element of the given class. For example, it is desirable in a cyan-magenta-yellow color scheme, where each pixel of an aspect viewing area contains an addressing element for, respectively, cyan, magenta, and yellow, to place all rotatable elements with a cyan-colored aspect proximal to the cyan addressing element, all rotatable elements with a magenta-colored aspect proximal to the magenta addressing element, and all rotatable elements with a yellow-colored aspect proximal to the yellow addressing element.

A further desired property of rotating element sheet material 18 is the ability to present several aspects of rotating element sheet material 18 with a relatively simple addressing scheme. Of particular interest are macroscopically viewed aspects, or multi-message aspects.

SUMMARY OF THE INVENTION

Accordingly, a first embodiment of the present invention of rotating element sheet material comprises a substrate, a plurality of rotatable elements of a first class, and a plurality of rotatable elements of a second class, where the substrate comprises a cavity-containing matrix having a plurality of cavities of a first class and a plurality of cavities of a second class. The plurality of rotatable elements of a first class are disposed within the plurality of cavities of a first class, and the plurality of rotatable elements of a second class are disposed within the plurality of cavities of a second class. Furthermore, the plurality of cavities of a first class and the plurality of cavities of a second class are arranged in a regular, repeating pattern in a substantially single layer. By addressing the plurality of cavities of a first class with a first addressing vector field, and addressing the plurality of cavities of a second class with a second addressing vector field, a display with multivalued aspects may be conveniently created.

A second embodiment of the present invention of rotating element sheet material comprises a substrate, a plurality of rotatable elements of a first class, and a plurality of rotatable elements of a second class, where the substrate comprises a cavity-containing matrix having a plurality of cavities of a first class and a plurality of cavities of a second class. The plurality of rotatable elements of a first class are disposed within the plurality of cavities of a first class, and the plurality of rotatable elements of a second class are disposed within the plurality of cavities of a second class. The plurality of rotatable elements of a first class have a common first addressing polarity and a common first work function. The plurality of rotatable elements of a second class have a common second addressing polarity and a common second work function. Furthermore, the common first work function is less than the common second work function. The plurality of cavities of a first class and the plurality of cavities of a second class are arranged in a substantially single layer and are arranged in a pattern that can be decomposed into a set of first aspect areas, a set of second aspect areas, and a set of null aspect areas. A macroscopic region that undergoes a correlated change in orientation of a set of rotatable elements in response to a change in the magnitude of the applied vector field determines an aspect area. Thus, a first aspect area is that macroscopic region that undergoes a correlated change in orientation of rotatable elements of a first class in response to a change in the applied vector field from essentially a zero value to the first work function, and that undergoes a correlated change in orientation of rotatable elements of a second class in response to a change in the applied vector field from the first work function to the second work function. Furthermore, a second aspect area is that macroscopic region that undergoes a correlated change in orientation of rotatable elements of a second class in response to a change in the applied vector field from essentially a zero value to the second work function, where the second work function is greater in magnitude than the first. The null aspect areas are those portions of the substrate that do not contain rotatable elements of a first class or rotatable elements of a second class or that contain rotatable elements that do not change orientation under the applied vector field. By addressing a macroscopic region with an addressing vector field that may be changed to selectively change one or more aspect areas, a multi-message display may be conveniently created.

In an embodiment of a method for assembling either the first embodiment of rotating element sheet material or a second embodiment of rotating element sheet material, the method comprises: providing a substrate component defining a plurality of microrecesses of a first class and a plurality of microrecesses of a second class; dispersing a plurality of rotatable elements of a second class onto the substrate component, where the rotatable elements of a second class are configured to preferably settle into the plurality of microrecesses of a second class only; and then dispersing a plurality of rotatable elements of a first class, where the rotatable elements of a first class are configured to settle into either the plurality of microrecesses of a first class or the plurality of microrecesses of a second class, but that the plurality of rotatable elements of a first class settle into the plurality of microrecesses of a first class only, since the plurality of microrecesses of a second class are already populated by the rotatable elements of a second class. The rotating element sheet material is then finished by the application of a substrate cover and enabling fluid.

In an embodiment of a method of macroscopically addressing the second embodiment of rotating element sheet material, the method comprises: providing the second embodiment of rotating element sheet material; introducing the second embodiment of rotating element sheet material to a macroscopic vector field at a first magnitude, where the first magnitude is greater that the first work function and less than the second work function; and then changing the magnitude of the macroscopic vector field from the first magnitude to a second magnitude, where the second magnitude is greater than the second work function. The effect of such a method of macroscopic addressing is to produce a dynamic change in a macroscopically viewed aspect of the rotating element sheet material, where the change in the macroscopically viewed aspect is determine by the first aspect areas, the second aspect areas, and the null aspect areas of the second embodiment of rotating element sheet material.

Additional features and advantages of the invention will be set forth in the description that follows, and in part will be apparent from the description, or may be learned by practice of the invention. The objectives and other advantages of the invention will be realized and attained by the process and apparatus particularly pointed out in the written description and claims herein as well as the appended drawings.

BRIEF DESCRIPTION OF DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
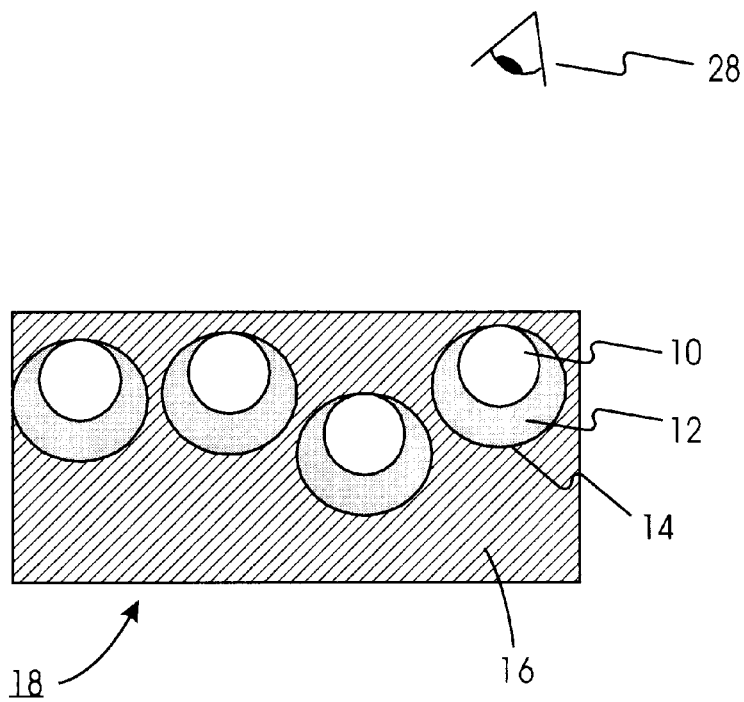
FIG. 1 depicts an exemplary subsection of rotating element sheet material of the prior art.
Figure 2:
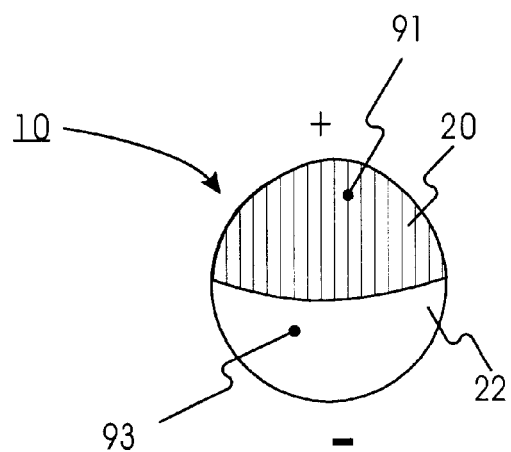
FIG. 2 depicts an exemplary rotatable element of the prior art with a two-valued aspect.
Figure 3:
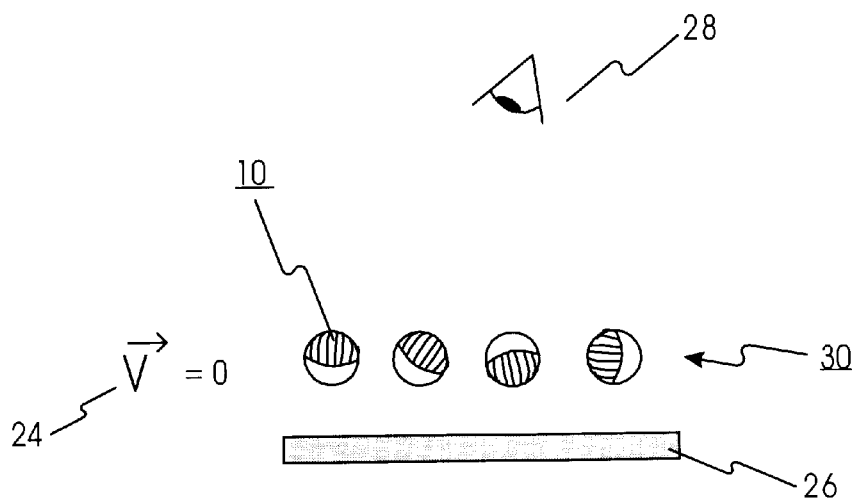
FIG. 3 depicts an exemplary system of the prior art that uses rotatable elements with two-valued aspects randomly oriented in the presence of an addressing vector field with zero magnitude.
Figure 4:
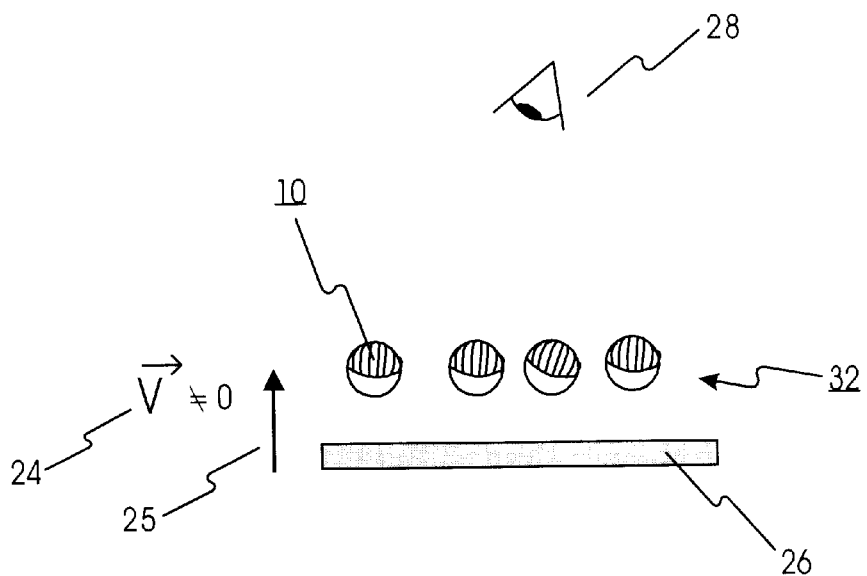
FIG. 4 depicts the exemplary system of FIG. 3 in the presence of a non-zero addressing vector field.
Figure 5:
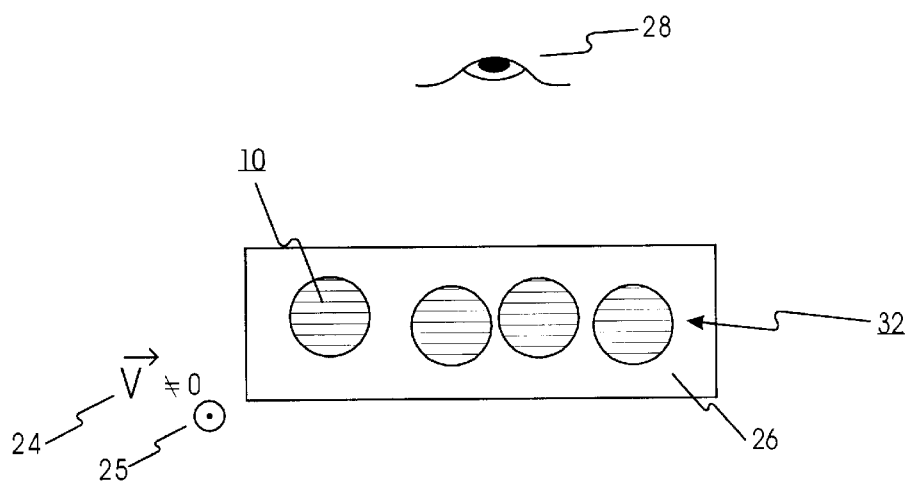
FIG. 5 depicts an alternate view of the exemplary system of FIG. 4.
Figure 6:
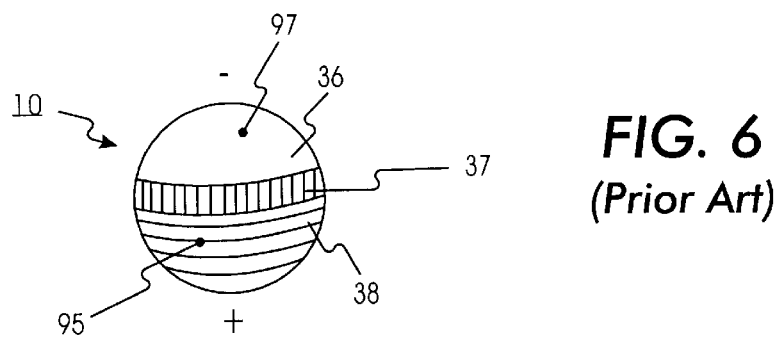
FIG. 6 depicts an exemplary rotatable element of the prior art with a multivalued aspect.
Figure 7:
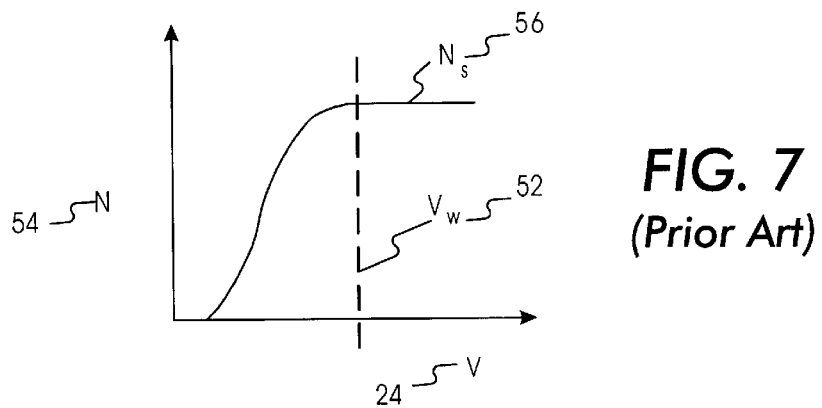
FIG. 7 depicts an exemplary graph of the number of rotatable elements that change orientation as a function of applied vector field of the prior art, displaying work function and saturation number.

One embodiment of the present invention comprises rotating element sheet material with a microstructured substrate component, and a method of assembling such rotating element sheet material. In another embodiment of the present invention, a method of use implements a macroscopic addressing technique for rotating element sheet material.

Reference will now be made in detail to an implementation consistent with the present invention as illustrated in the accompanying drawings. Whenever possible, the same reference number will be used throughout the drawings and the following description to refer to the same or like parts.

Definitions

As used herein, "aspect" refers to a common response to incident electromagnetic energy of interest. For example, if the incident electromagnetic energy of interest lies in the visible spectrum, then a first aspect can correspond to a black appearance, and a second aspect can correspond to a white appearance. If the incident electromagnetic energy of interest lies in the x-ray region, then a first aspect can correspond to the transmission of the x-ray energy, while a second aspect can correspond to the absorption of the x-ray energy. Furthermore, the "common response" can comprise any of the phenomena of absorption, reflection, polarization, transmission, fluorescence, or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer can refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "vector field" refers to a field whose amplitude in space is capable of having a magnitude and a direction. Vector fields of interest in the present invention include electric fields, magnetic fields, or electromagnetic fields.

As used herein, "work function" refers to the amount of energy necessary to overcome the attraction between a rotatable element and the substrate structure so as to enable a change of orientation, as for example, between the rotatable element and the cavity walls. A host of factors influence the magnitude of the energy associated with the work function including, but not limited to: surface tension of enabling fluid in contact with rotatable elements; the relative specific gravity of enabling fluid and rotatable element; magnitude of charge on rotatable element; relative electronic permittivity of enabling fluid and substrate structure; "stickiness" of substrate structure; and other residual vector fields that may be present.

As used herein, "diameter" refers to an order of magnitude dimension corresponding to any of height, width, and depth of any of rotatable elements or microrecesses. The use of "diameter" does not imply that circular or spherical geometry only is under consideration.

As used herein, "macroscopic" refers to an aspect or region that is large enough to be perceived by an unaided observer, as, for example, aspects that convey warnings or other information to human perceivers.

Microstructured Substrate Component 1

Figure 8:
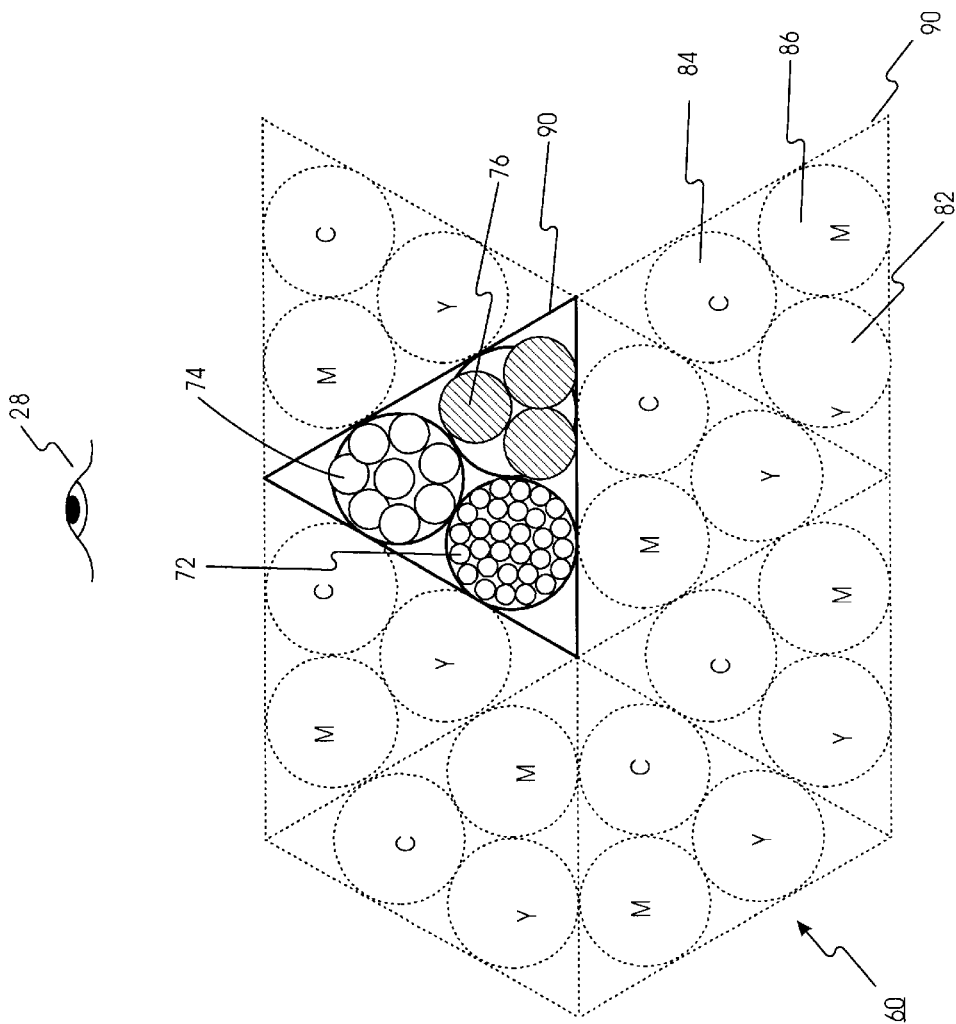
FIG. 8 is a perspective view of a exemplary substrate component consistent with the present invention where microrecesses of specified diameters are located in specified regions in a regular, repeating pattern.

FIG. 8 depicts a perspective view of subsection 60 of a microstructured substrate component for use in rotating element sheet material consistent with the present invention. Within pixel space 90 are microrecesses of a first class 72, microrecesses of a second class 74, and microrecesses of a third class 76. A cluster of each of microrecesses of a first class 72, microrecesses of a second class 74, and microrecesses of a third class 76 are shown within first addressing region 82, second addressing region 84 and third addressing region 86, respectively. Finally, each pixel space 90 in FIG. 8 contains one of first addressing region 82, second addressing region 84, and third addressing region 86. Although the clusters of microrecesses are shown only in one pixel space 90 for convenience, they are present in all pixel spaces 90 on the microstructured surface. By way of example only in FIG. 8, first addressing region 82 corresponds to addressing a yellow-colored aspect, indicated by the symbol "Y", second addressing region 84 corresponds to addressing a cyan-colored aspect indicated by the symbol "C", and third addressing region 86 corresponds to addressing a magenta-colored aspect indicated by the symbol "M." One of skill in the art will appreciate that other choices are also possible.

Pixel space 90 containing microrecesses of a first class 72, microrecesses of a second class 74, and microrecesses of a third class 76, is repeated to form a regular, repeating pattern in a preferred embodiment of the present invention, where the above microrecesses are correlated with an addressing array with the pattern given by first addressing region 82, second addressing region 84 and third addressing region 86.

Figure 9:
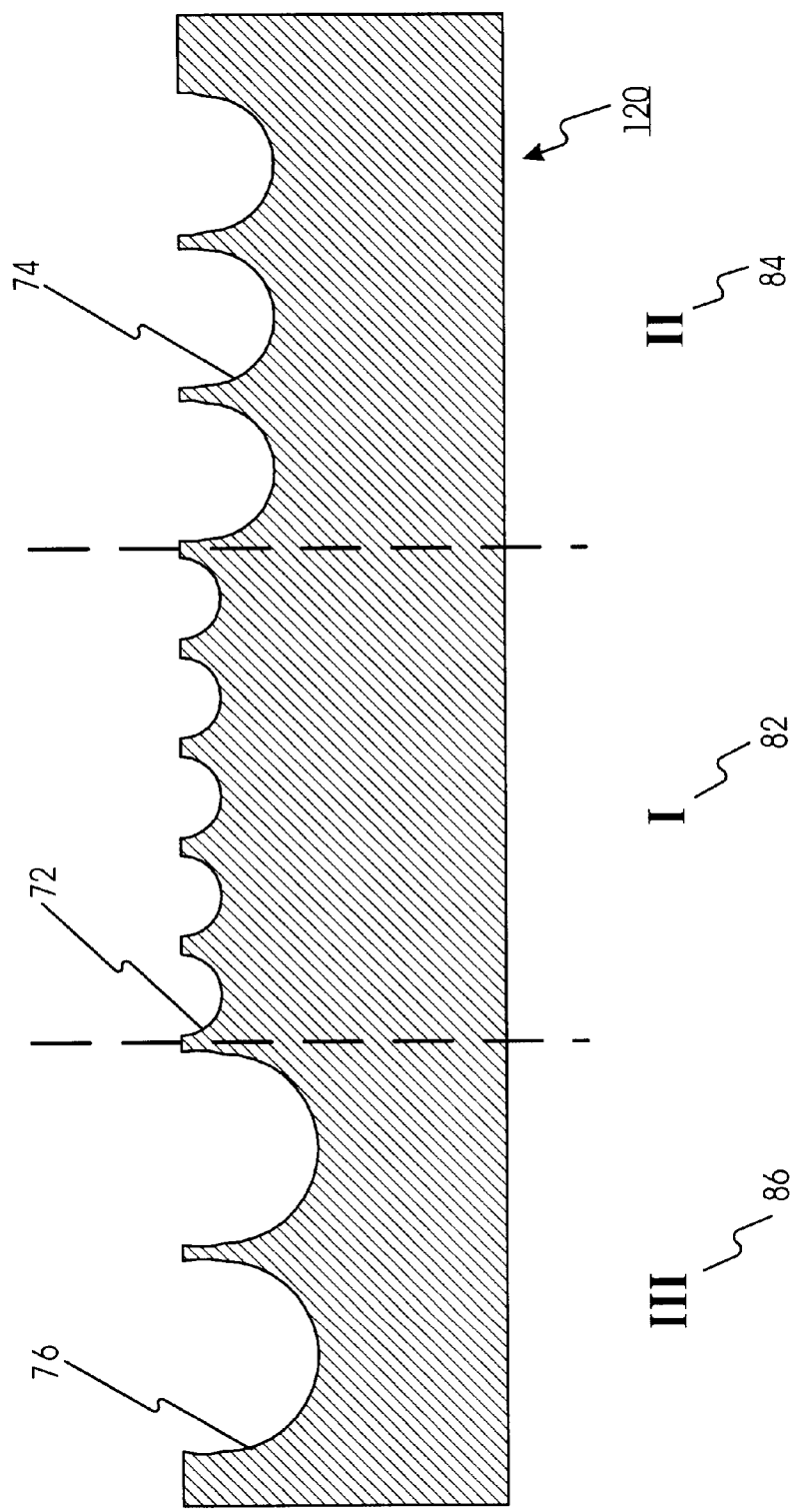
FIG. 9 is a cross section view of a section of the substrate component of FIG. 8 indicating specified regions.
Figure 10:
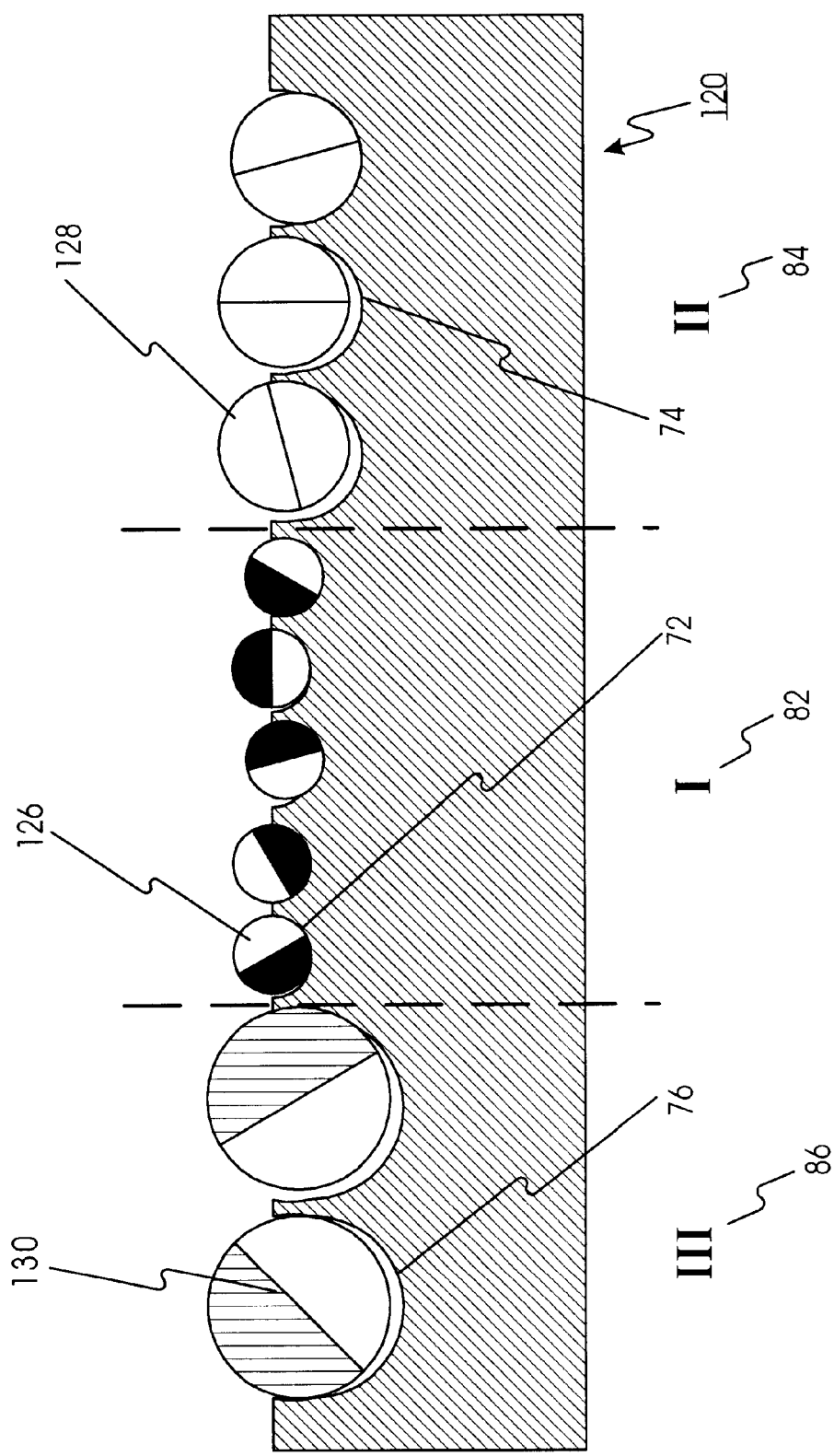
FIG. 10 is a cross section view of the substrate component of FIG. 8 after all of the rotatable elements have been placed in their specified regions, consistent with the present invention.

In the example depicted in FIG. 8, one difference between microrecesses of a first class 72, microrecesses of a second class 74, and microrecesses of a third class 76 is their characteristic diameter. This is depicted in cross-section view in FIG. 9, along with the dotted lines at the boundary of first addressing region 82, second addressing region 84, and third addressing region 86. In the exemplary substrate component 120, microrecesses of a first class 72 are smaller than microrecesses of a second class 74, which are smaller than microrecesses of a third class 76. In a preferred embodiment of the present invention, microrecesses of a first class 72 are designed to accommodate rotatable elements of a first class 126, microrecesses of a second class 74 are designed to accommodate rotatable elements of a second class 128, and microrecesses of a third class 76 are designed to accommodate rotatable elements of a third class 130. This is depicted in FIG. 10, showing a cross section of substrate component 120 consistent with the present invention. Also shown in FIG. 10 are vertical lines indicating the boundaries between first addressing region 82, second addressing region 84, and third addressing region 86.

In a preferred embodiment of the present invention, rotatable elements of a first class 126, rotatable elements of a second class 128, and rotatable elements of a third class 130 have one aspect in common and a second aspect that is different for each. This is indicated in FIG. 10. In FIG. 10, rotatable elements of a first class 126, rotatable elements of a second class 128, and rotatable elements of a third class 130 are all bichromal rotatable elements with a first orientation that presents a white-colored aspect. A second orientation for each of the rotatable elements presents, in turn, a yellow-colored aspect for rotatable elements of a first class 126, a cyan-colored aspect for rotatable elements of a second class 128, and a magenta-colored aspect for rotatable elements of a third class 130. One of skill in the art will appreciate that other aspects and combinations are also possible.

Similarly, in a preferred embodiment of the present invention, the addressing regions depicted in FIG. 8 are correlated with the addressing of a particular aspect. In the exemplary substrate component depicted in FIGS. 8–10 and as described above, first addressing region 82 is correlated with addressing a yellow-colored aspect, second addressing region 84 is correlated with addressing a cyan-colored aspect, and third addressing region 86 is correlated with addressing a magenta-colored aspect. Such an addressing system may be used, for example, as disclosed in U.S. Pat. No. 5,767,826, hereinabove incorporated by reference.

One skilled in the art will appreciate that although spheroid-shaped rotatable elements and microrecesses are depicted, other shapes such as cylindrical shapes, are also possible. Furthermore, although each microrecess is indicated as accommodating one rotatable element, one of skill in the art will appreciate that a given microrecess can accommodate more than one rotatable element, as in the case where the microrecesses are grooves.

Furthermore, one skilled in the art will appreciate that although FIG. 8 depicts microrecesses of a first class 72, microrecesses of a second class 74, and microrecesses of a third class 76 in a non-optimally packed configuration, such microrecesses may be ordered such that a higher density of any of rotatable elements of a first class 126, rotatable elements of a second class 128, and rotatable elements of a third class 130 may be achieved.

In the preferred embodiment discussed above, rotating element sheet material is finished by the application of an enabling fluid and a cover sheet to complete the substrate, as disclosed, for example, in U.S. Pat. No. 5,815,306, herein incorporated by reference. The combination of the cover sheet and the microstructured substrate component 120 described above will define a plurality of cavities of a first class, a plurality of cavities of a second class, and a plurality of cavities of a third class, where the plurality of cavities of all classes will be disposed substantially in a single layer. Furthermore, the plurality of cavities of a first class, a plurality of cavities of a second class, and a plurality of cavities of a third class will form a regular, repeating pattern, based on the regular, repeating pattern of microrecesses of a first class 72, microrecesses of a second class 74, and microrecesses of a third class 76, as depicted, for example, in FIG. 8. Such rotating element sheet material may then be easily coupled with an addressing system, where the addressing system, at the pixel level, is correlated with first addressing region 82, second addressing region 84, and third addressing region 86, to address, respectively, a yellow-colored aspect, a cyan-colored aspect, and a magenta-colored aspect. One of skill in the art will appreciate that other choices and configurations are available as well.

Method of Substrate System Assembly

In order to take advantage of an addressing scheme where one region addresses only one aspect, say a yellow-colored aspect as disclosed, for example, in U.S. Pat. No. 5,767,826, hereinabove incorporated by reference, the appropriate rotatable elements must be placed in the appropriate locations. The present invention allows for the placement of rotatable elements to specified positions, as described below.

Figure 11:
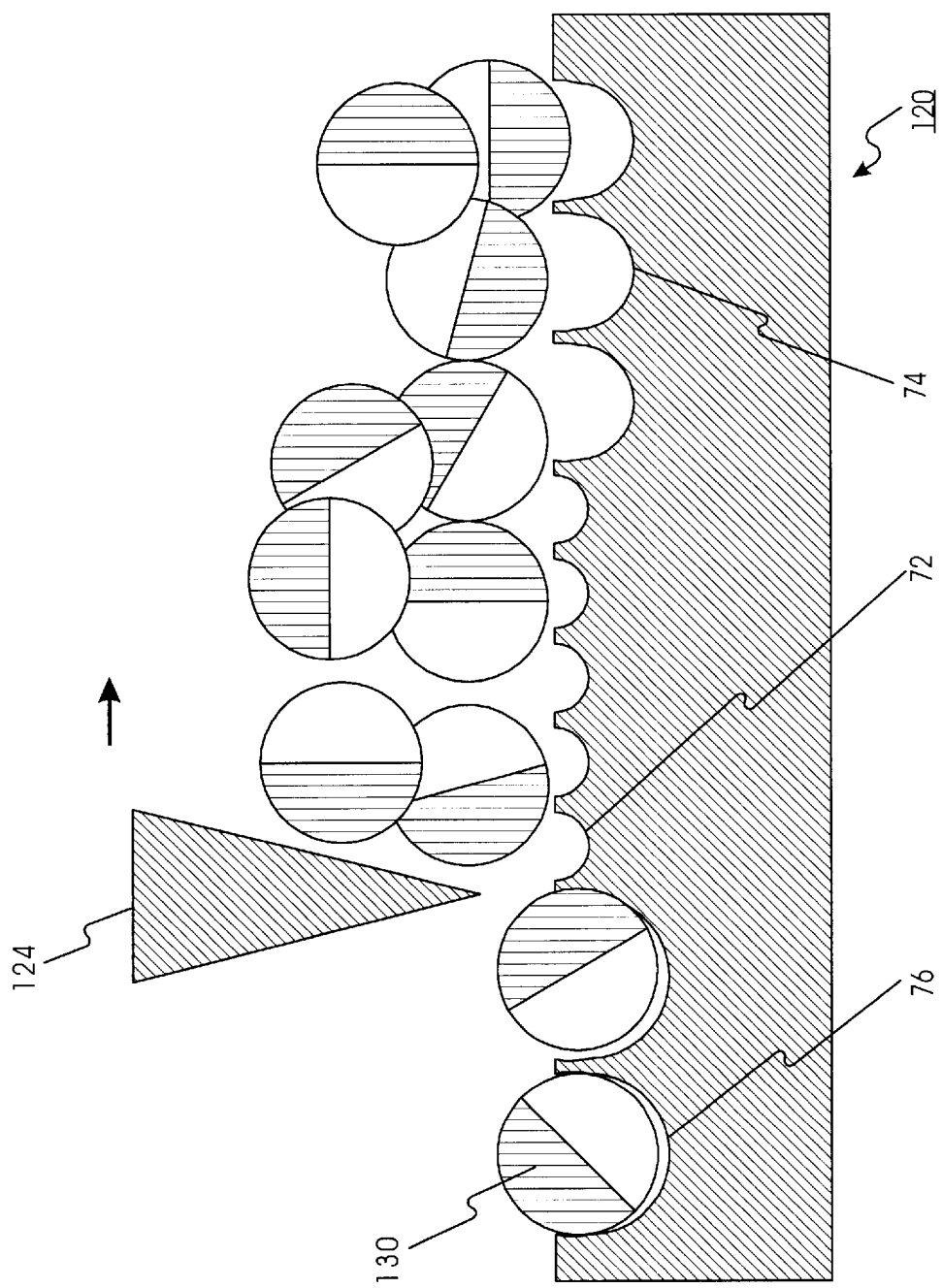
FIG. 11 is a cross section view of a method of placing the largest sized rotatable elements in the substrate component of FIG. 8 consistent with the present invention.

The method for placing rotatable elements is based on the fact that a given microrecess will only admit a rotatable element that has the same diameter or that has a smaller diameter. Thus, the steps of assembling rotating element sheet material using such a substrate component involve, first, dispersing the largest rotatable elements over the substrate component, and allowing the rotatable elements to settle into appropriate microrecesses. This is depicted in FIG. 11. Rotatable elements of a third class 130 position only into microrecesses of a third class 76. Because rotatable elements of a third class 130 are too large to position into either microrecesses of a second class 74 or microrecesses of a first class 72, doctor blade 124 can be used to remove excess rotatable elements of a third class 130. One skilled in the art will appreciate that other means, such as agitation of substrate component 120, are also available to remove excess rotatable elements of a third class 130.

Figure 12:
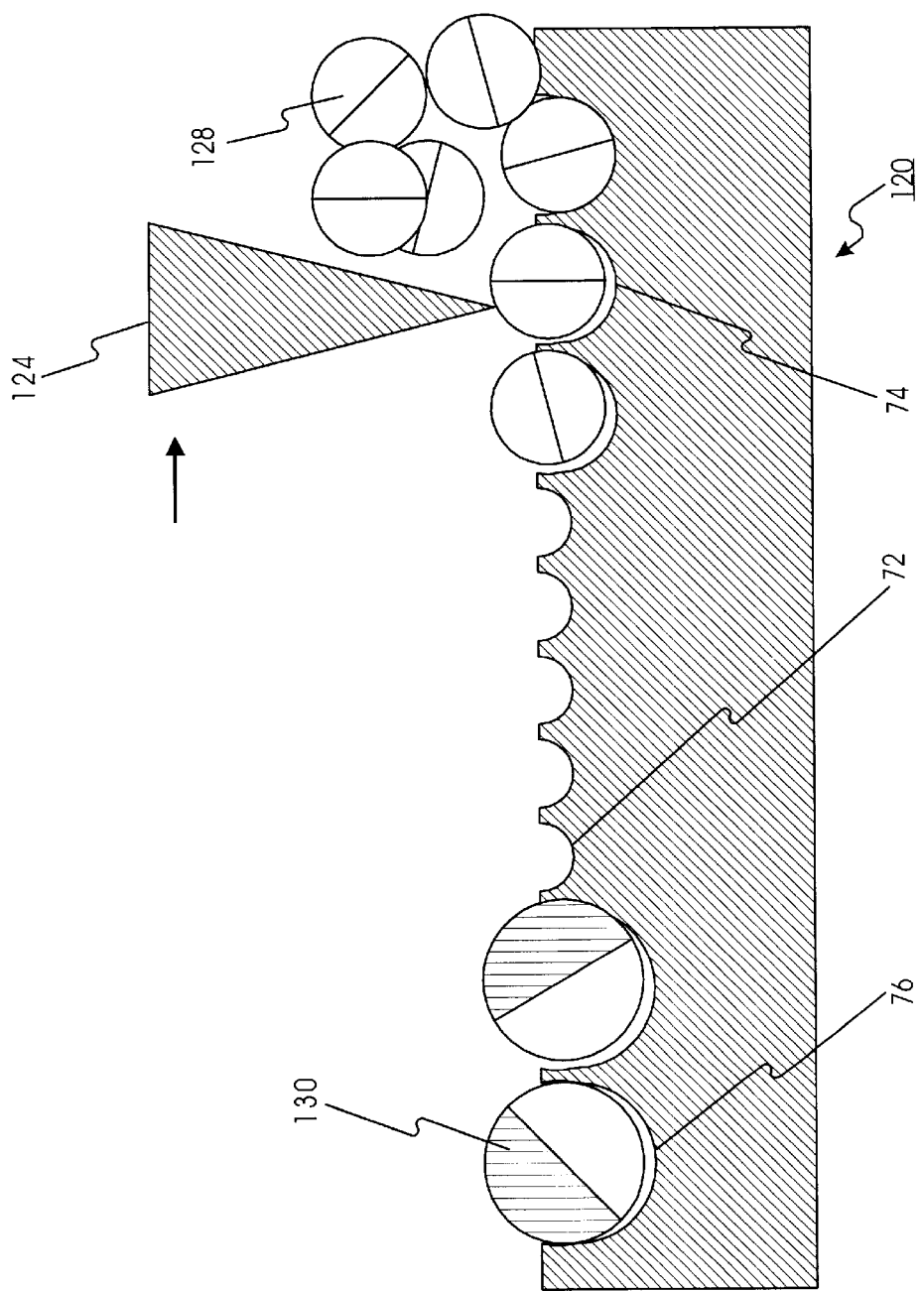
FIG. 12 is a cross section view of a method of placing the next smallest sized rotatable elements in the substrate component of FIG. 8 after the largest sized rotatable elements are placed, consistent with the present invention.

After the rotatable elements of a third class 130 are placed into microrecesses of a third class 76, rotatable elements of a second class 128 can be dispersed over substrate component 120, again, to settle into appropriately-sized microrecesses. Again, rotatable elements of a second class 128 will not settle into the microrecesses too small for them, and cannot settle into the larger microrecesses since they are already populated. Furthermore, doctor blade 124 can be used to remove excess rotatable elements of a second class 128, while riding over the tops of those rotatable elements of a second class 128 that have positioned into microrecesses. This is depicted in FIG. 12.

Figure 13:
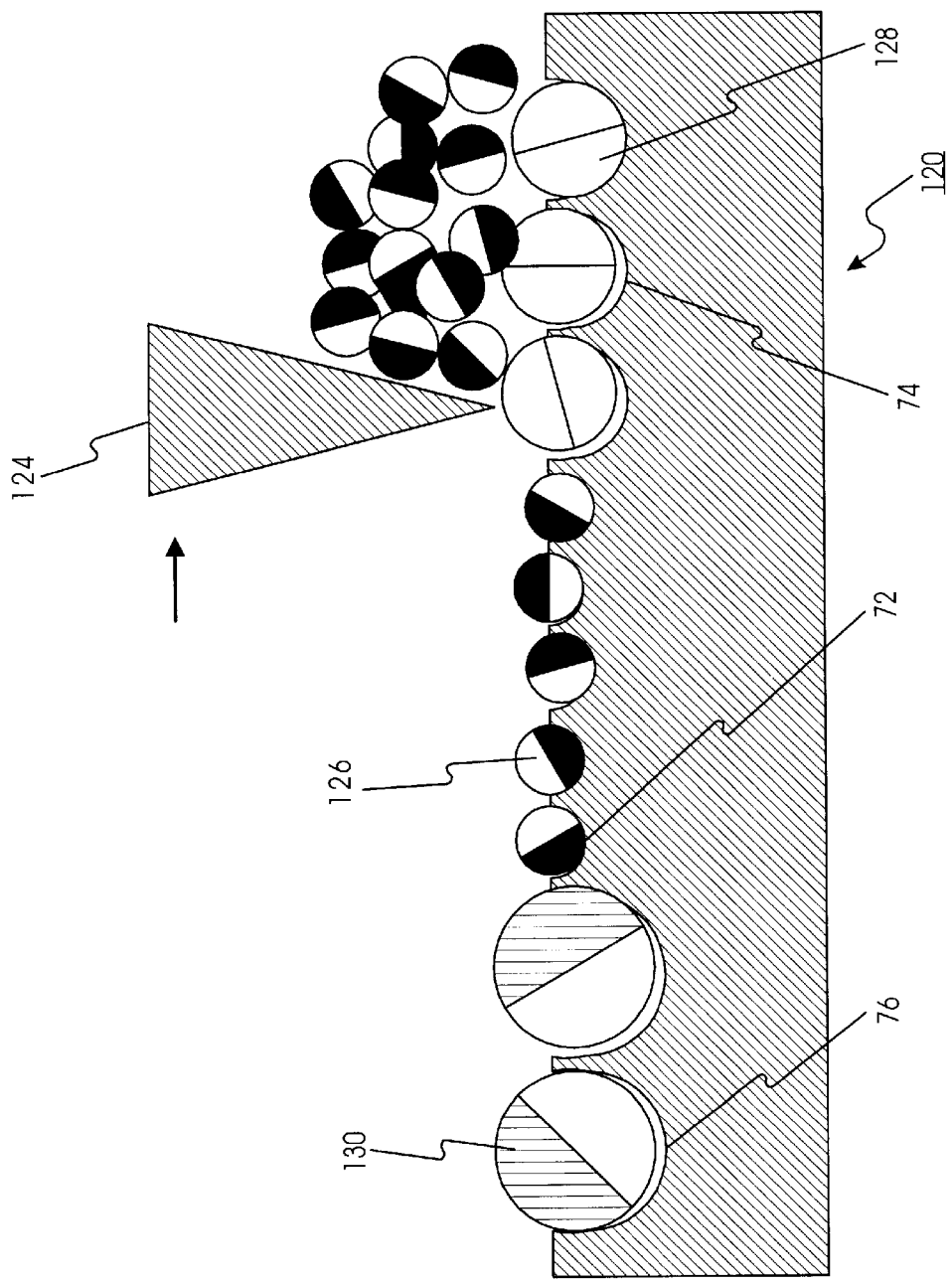
FIG. 13 is a cross section view of a method of placing the smallest sized rotatable elements in the substrate component of FIG. 8 after the two larger-sized rotatable elements are placed, consistent with the present invention.

Finally, rotatable elements of a first class 126, are dispersed over substrate component 120, again, to settle into appropriate microrecesses. Again, rotatable elements of a first class 126 cannot settle into the larger recesses since they are already populated. Furthermore, doctor blade 124 can be used to remove excess rotatable elements of a first class 126, while riding over the tops of those rotatable elements of a first class 126 that have positioned into microrecesses. This is depicted in FIG. 13. Rotating element sheet material is then finished by application of an enabling fluid and a cover sheet to complete the substrate, as disclosed, for example, in U.S. Pat. No. 5,815,306, herein incorporated by reference. The combination of the cover sheet and the microstructured substrate component 120 described above will define a plurality of cavities of a first class, a plurality of cavities of a second class, and a plurality of cavities of a third class, where the plurality of cavities of all classes will be disposed substantially in a single layer. Furthermore, the plurality of cavities of a first class, a plurality of cavities of a second class, and a plurality of cavities of a third class will form a regular, repeating pattern, based on the regular, repeating pattern of microrecesses of a first class 72, microrecesses of a second class 74, and microrecesses of a third class 76, as depicted, for example, in FIG. 8.

One skilled in the art will appreciate that between the successive dispersing of different sized rotatable elements, the previously placed rotatable elements may be translationally confined to specified positions through some means. For example, the previously placed rotatable elements may be translationally confined to their specified positions through the application of some temperature change to substrate component 120, or through the application of some curing solution. One of skill in the art will also appreciate that such rotatable elements may be translationally confined without affecting their rotational degrees of freedom within the respective microrecesses.

The fabrication of different-sized microrecesses in the substrate component can be accomplished by a number of means. For example, precise molding can be used, as well as conventional hot stamping with a metal master or embossing. Conventional photo-lithographic patterning can be accomplished using optical masking and selective etching, controlled laser ablation, or using a photosensitive material, as, for example, a photo-resist, as described in U.S. Pat. No. 5,815,306, hereinabove incorporated by reference.

Microstructured Substrate System 2

Figure 14:
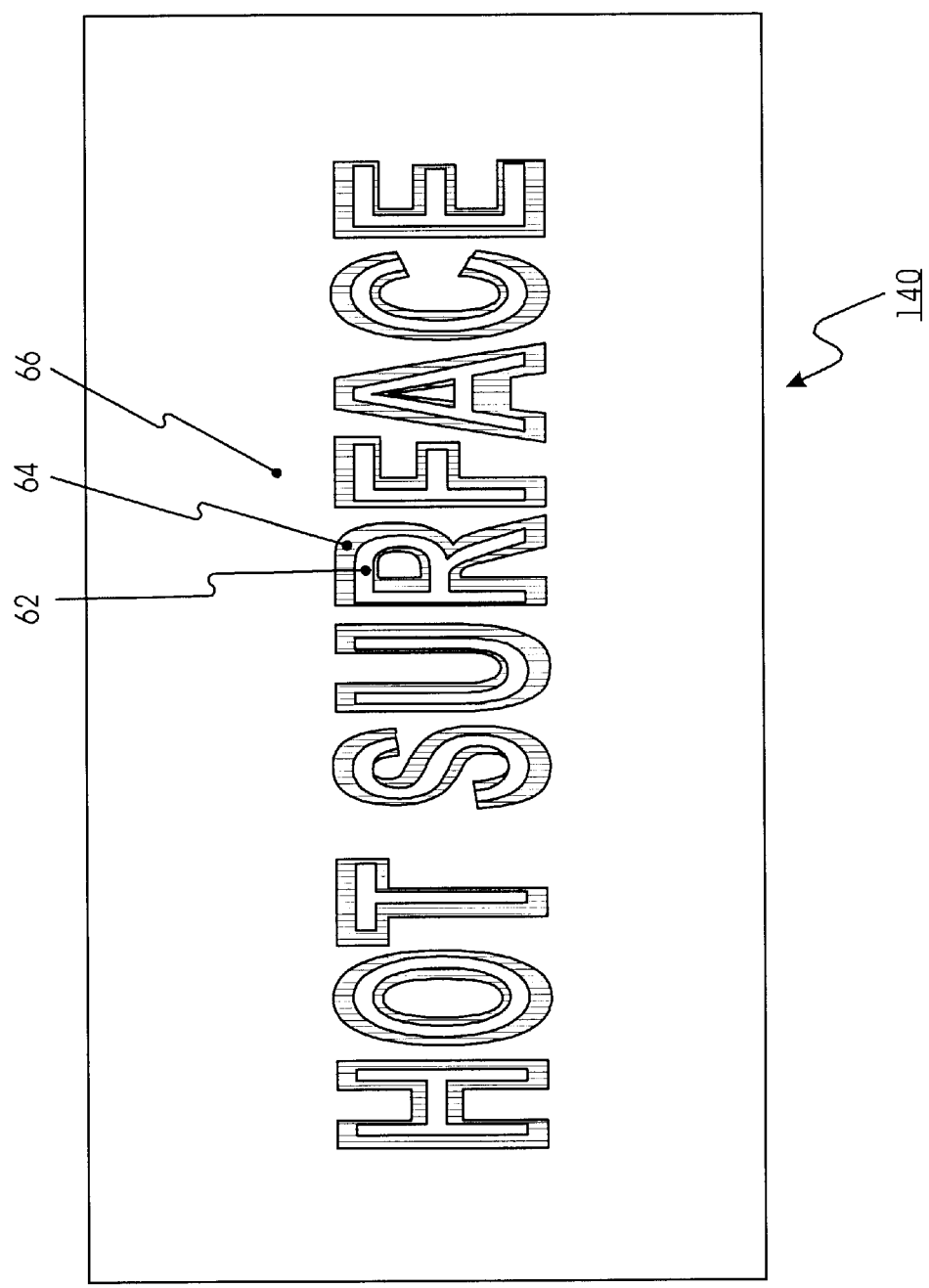
FIG. 14 is a perspective view of an exemplary substrate component consistent with the present invention and displaying two aspect areas and null areas associated with a dynamic message "HOT SURFACE."
Figure 15:
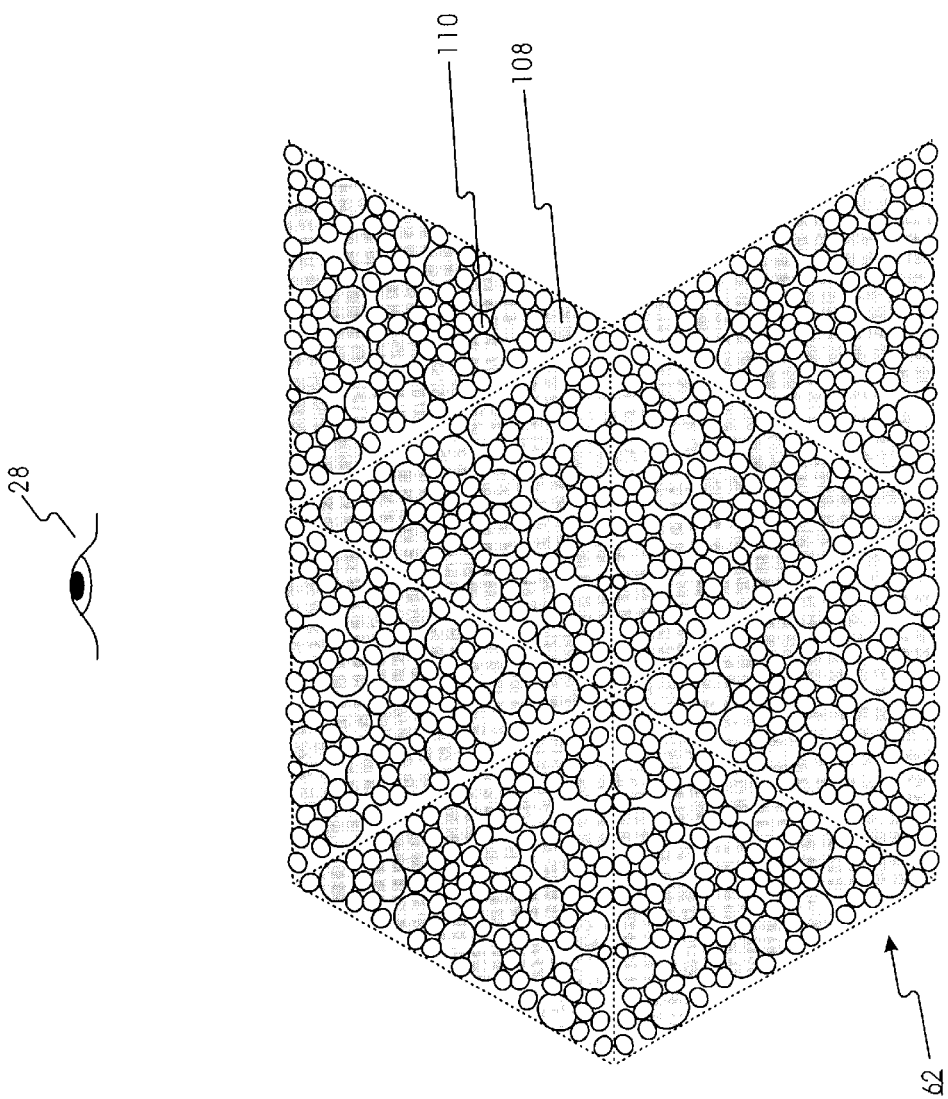
FIG. 15 is a perspective view of a section of the first aspect area of the substrate component of FIG. 14.
Figure 16:
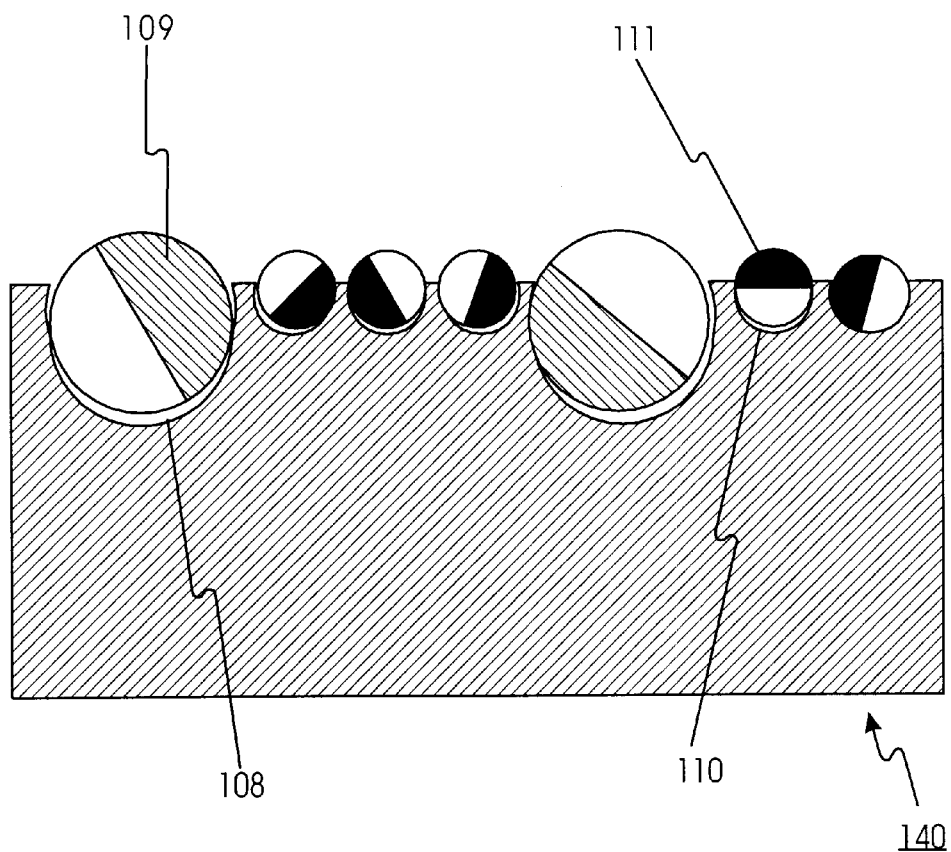
FIG. 16 is a cross section view of the substrate component of FIG. 15 after all of the rotatable elements have been placed in their appropriate microrecesses within the first aspect area, consistent with the present invention.

A perspective view of a substrate component 140 consistent with a second embodiment of the present invention is depicted in FIG. 14. In this embodiment, there is a fixed macroscopic message patterned into substrate component 140 with assorted aspect areas. The aspect areas are macroscopic regions correlated with a given work function threshold, and given rotatable elements displaying a given macroscopic aspect. For example, in FIG. 14, there is a fixed message "HOT SURFACE." There are two aspect areas and null aspect areas in the exemplary substrate component of FIG. 14. There is first aspect area 62 and second aspect area 64. A close-up view of the microstructured surface associated with first aspect area 62 is depicted in FIG. 15. In FIG. 15, first aspect area 62 contains two types of microrecesses: microrecesses of a first class 110 and microrecesses of a second class 108. Again, microrecesses of a first class 110 and microrecesses of a second class 108 have different characteristic diameters. Rather than having each set of microrecesses correlated with a given addressing region, however, both microrecesses of a first class 110 and microrecesses of a second class 108 are contained within one macroscopic addressing region. As shown in FIG. 16, and in a preferred embodiment of the present invention, microrecesses of a first class 110 are designed to accommodate rotatable elements of a first class 111, which presents a white-colored aspect in a first orientation, and a yellow-colored aspect in a second orientation. Likewise, microrecesses of a second class 108 are designed to accommodate rotatable elements of a second class 109, which presents a white-colored aspect in a first orientation, and an orange-colored aspect in a second orientation. The use of rotatable elements with a yellow-colored aspect and rotatable elements with an orange-colored aspect is exemplary only and other choices are also consistent with the present invention.

Figure 17:
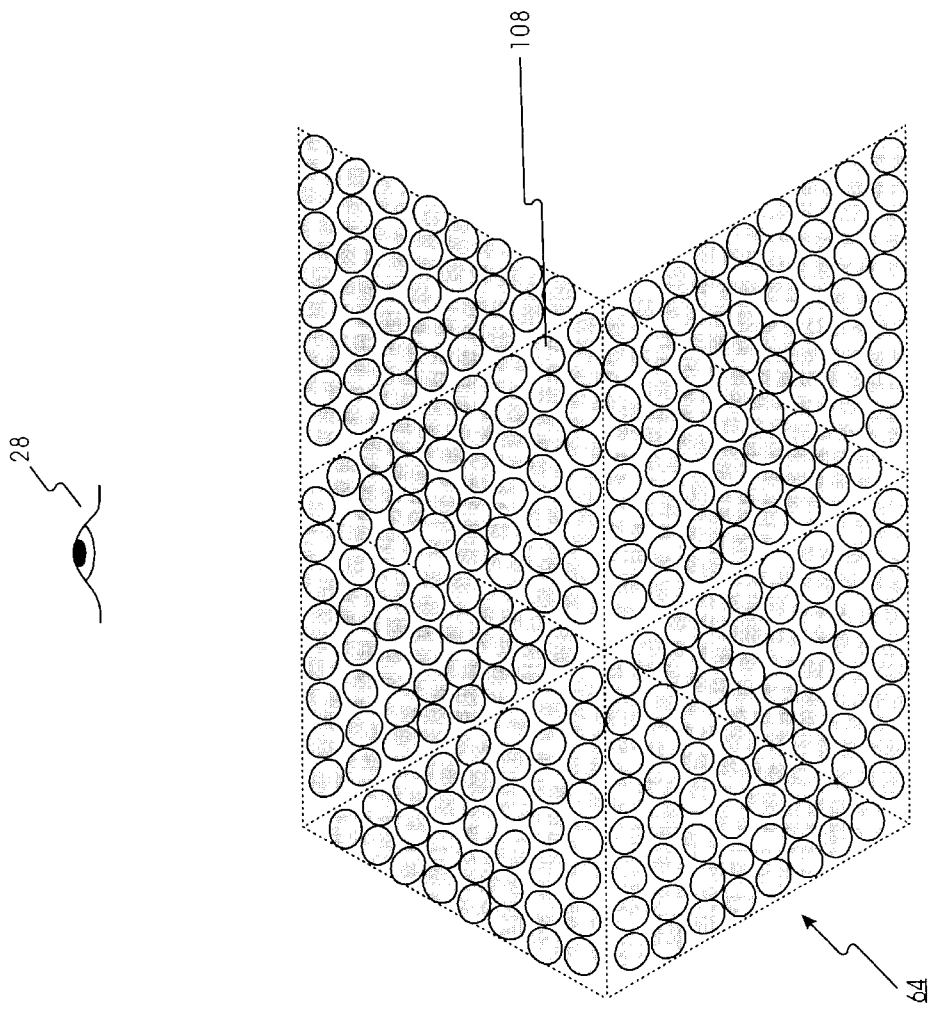
FIG. 17 is a perspective view of a section of the second aspect area of the substrate component of FIG. 14.

A close-up view of the microstructured surface associated with second aspect area 64 of FIG. 14 is depicted in FIG. 17. Again, in FIG. 17, second aspect area 64 contains microrecesses of a second class 108 only. In a preferred embodiment of the present invention, microrecesses of a second class 108 are designed to accommodate a rotatable elements of a second class 109, which presents a white-colored aspect in a first orientation, and an orange-colored aspect in a second orientation.

Figure 18:
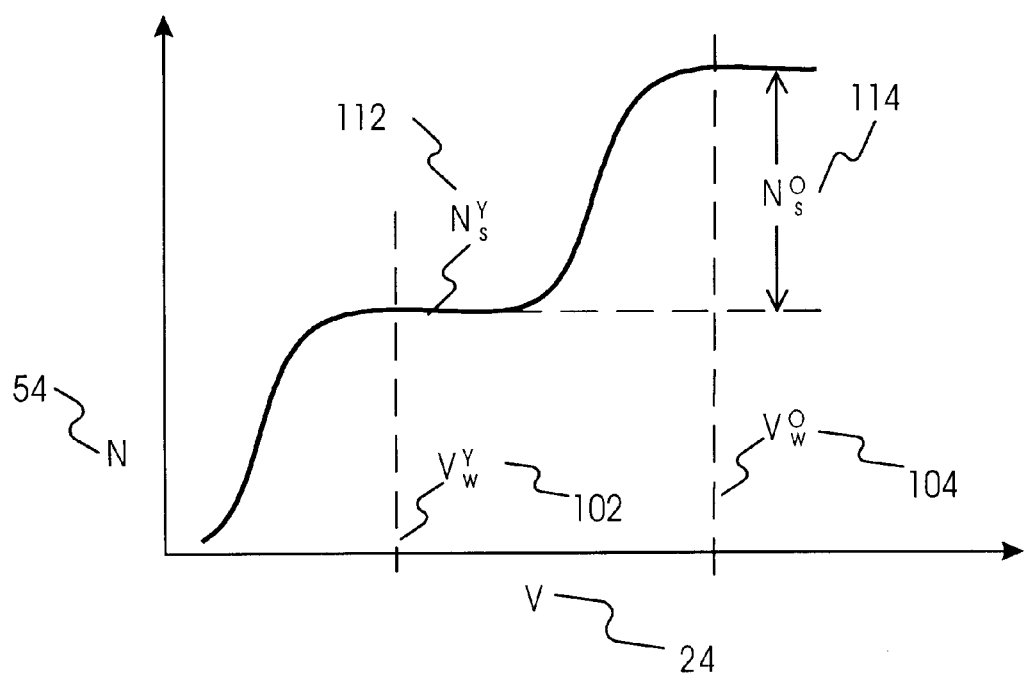
FIG. 18 depicts an exemplary graph of the number of rotatable elements that change orientation as a function of applied field, displaying work function and saturation numbers for the microrecesses and rotatable elements of FIG. 16.

The work function associated with microrecesses of a first class 110 and microrecesses of a second class 108 containing rotatable elements of a first class 111 and rotatable elements of a second class 109 respectively is depicted in FIG. 18. As disclosed in U.S. Pat. No. 5,739,801, herein incorporated by reference, the larger the diameter of a rotatable element, the larger the associated work function, other things being equal. In FIG. 18, the lower threshold 102, $V_W^Y$, represents the threshold necessary to address the saturation number 112, $N_S^Y$, of the rotatable elements of a first class 111; the higher threshold 104, $V_W^O$, represents the threshold necessary to address both the saturation number 112, $N_S^Y$, of rotatable elements of a first class 111 and the saturation number 114, $N_S^O$, of rotatable elements of a second class 109.

As above, the fabrication of different-sized microrecesses in the substrate component can be accomplished by a number of means. For example, precise molding can be used, as well as conventional hot stamping with a metal master or embossing. Conventional photo-lithographic patterning can be accomplished using optical masking and selective etching, controlled laser ablation, or using a photosensitive material, as, for example, a photo-resist, as described in U.S. Pat. No. 5,815,306, hereinabove incorporated by reference.

Also as described above, the rotatable elements can be placed onto the microstructured surface by first applying the largest-sized rotatable elements, and then successively applying smaller sized rotatable elements until all of the microrecesses are occupied. Rotating element sheet material is then finished by application of an enabling fluid and a cover sheet to complete the substrate, as disclosed, for example, in U.S. Pat. No. 5,815,306, hereinabove incorporated by reference. The combination of the cover sheet and the microstructured substrate component 120 described above will define a plurality of cavities of a first class, a plurality of cavities of a second class, and a plurality of cavities of a third class, where the plurality of cavities of all classes will be disposed substantially in a single layer. Furthermore, the plurality of cavities of a first class, a plurality of cavities of a second class, and a plurality of cavities of a third class will form a macroscopic pattern, based on the macroscopic pattern of microrecesses of a first class 108 and microrecesses of a second class 110, as depicted, for example, in FIGS. 14, 15, and 17.

Method of Macroscopic Addressing

Figure 19:
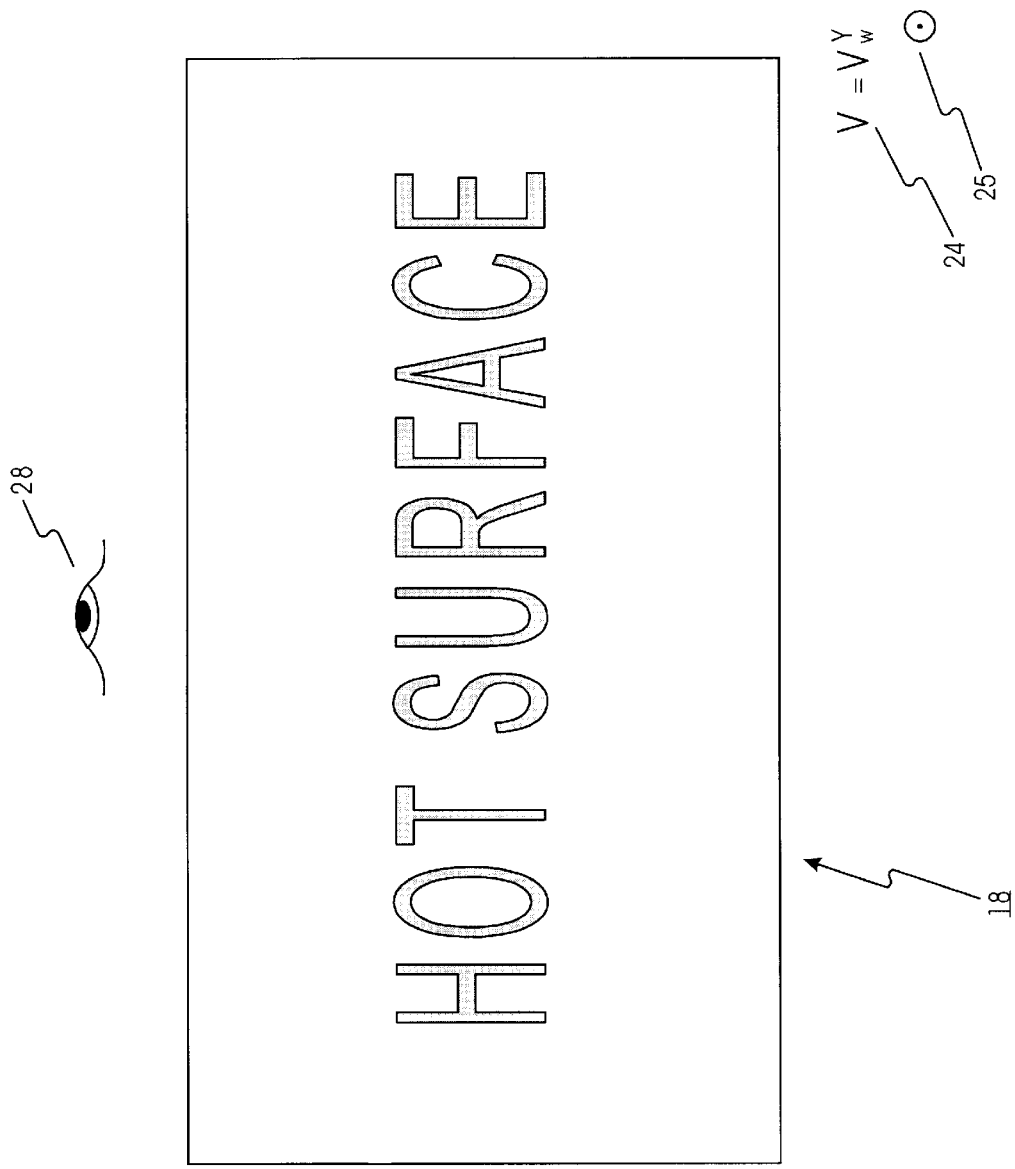
FIG. 19 is a perspective view of rotating element sheet material assembled with the substrate component of FIG. 14 and with an applied vector field at the lowest work function of FIG. 18.
Figure 20:
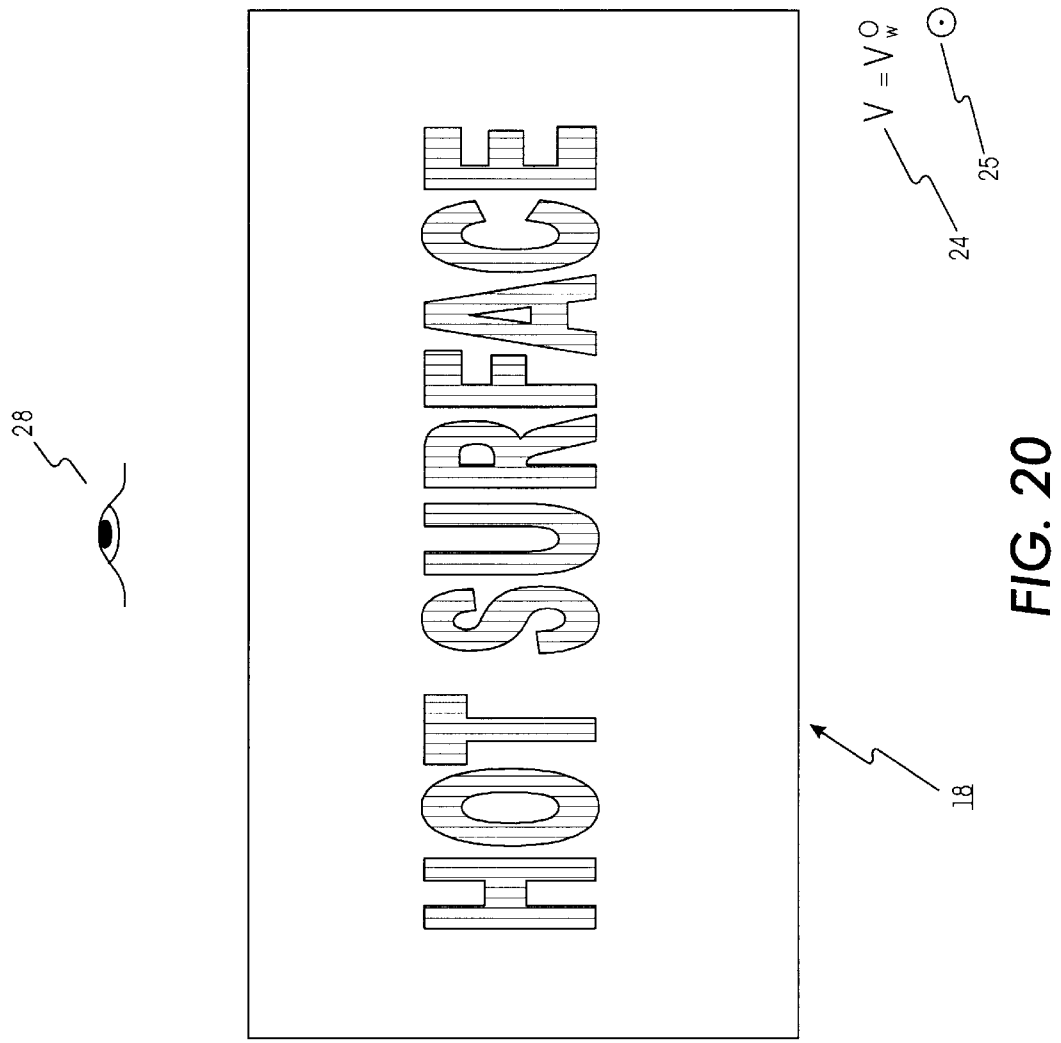
FIG. 20 is a perspective view of rotating element sheet material assembled with the substrate component of FIG. 14 and with an applied vector field at the highest work function of FIG. 18.

In a preferred embodiment of the present invention, rotating element sheet material 18 is constructed using substrate component 140 of FIG. 14 by applying enabling fluid and a cover sheet, as disclosed in U.S. Pat. No. 5,815,306, hereinabove incorporated by reference. The combination of the cover sheet and the microstructured substrate component 140 described above will define a plurality of cavities of a first class and a plurality of cavities of a second class where the plurality of cavities will be disposed substantially in a single layer. FIGS. 19 and 20 indicate how the fixed message "HOT SURFACE" acquires a dynamic attribute according to the magnitude of the addressing vector field.

In this embodiment of the present invention, it is supposed that, initially, all of the rotatable elements are oriented such that their white-colored aspect, or another preferred common aspect, is viewed by a favorably situated observer. For example, a macroscopic vector field applied at a relatively high work function will introduce such an orientation, where the macroscopic region contains the entire viewing region.

Following such an initial orientation, FIG. 19 indicates the response of rotating element sheet material 18 in an embodiment consistent with the present invention when the applied macroscopic vector field has a value above the lower threshold 102, but below the higher threshold 104 of FIG. 15. In this case, all of rotatable elements of a first class 111 will present their yellow-colored aspect to a favorably situated observer. Thus, a message "HOT SURFACE" in a font with a narrow type-face in the above embodiment can be made to appear in yellow.

Next, if the applied macroscopic vector field has a value above the higher threshold 104, then the fixed message of FIG. 20 can be made to appear. In this case, it is the same message "HOT SURFACE" but in a bolder typeface in the above embodiment, as well as presenting an orange-colored aspect to a favorably situated observer.

One skilled in the art will appreciate that, alternatively, rotatable elements of a fourth class may be introduced in the above embodiment that present a red-colored aspect in a first orientation and a white-colored aspect in a second orientation, and that exhibit a work function close to that of rotatable elements of a second class 109. The rotatable elements of a fourth class may be placed in those microrecesses of a second class 108 adjacent to microrecesses of a first class 110, as depicted in FIG. 15 in first aspect area 62. The remaining microrecesses of a second class 108 not adjacent to microrecesses of a first class 110, as depicted in FIG. 17 in second aspect area 64, contain rotatable elements of a second class 109 as above. By so introducing rotatable elements of a fourth class, the message at the higher threshold can be made to appear entirely in orange again, as the macroscopic combination of a red-colored aspect and a yellow-colored aspect in first aspect area 62 can be made to appear orange. Again, the use of a red-colored aspect is exemplary only, and one of skill in the art will appreciate that any suitable aspect of third rotatable elements that, when macroscopically combined with the aspect of second rotatable elements yields an aspect similar to first rotatable elements, may be chosen.

One skilled in the art will also appreciate that the yellow-colored aspects can be made to reorient their white-colored aspects towards the favorably situated observer, using, for example, a multi-threshold addressing scheme described in U.S. Pat. No. 5,739,801, hereinabove incorporated by reference, and so adapted for macroscopic application.

Additionally, one skilled in the art will appreciate that the dynamic fixed messages "HOT SURFACE" is exemplary only. Any fixed message or graphic can be presented, such as successively displaying "WARNING," "DANGER," and "CAUTION." In addition, bar graphs may be created, whereby the rotatable elements can have the same aspects, but differing work functions, such that the successive application of a higher vector field will orient successively placed rotatable elements, enlarging or reducing the resulting macroscopically viewed aspect.

Finally, although subtractive color mixing was presented in the exemplary inventions, one of skill in the art will appreciate that additive color combinations are also possible, as disclosed, for example, in U.S. Pat. No. 5,737,115, hereinabove incorporated by reference.

Conclusion

Methods and apparatus consistent with the present invention can be used to prepare and address rotating element sheet material with a microstructured substrate. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, some of the examples used the spectrum associated with visible light as the electromagnetic energy of interest. However, the use of any electromagnetic energy, including infrared, ultraviolet and x-rays as the electromagnetic energy of interest is consistent with the present invention. Accordingly, the invention is not limited to the above described embodiments, but instead is defined by the appended claims in light of their full scope of equivalents.

What is claimed is:

1. Rotating element sheet material comprising:

a substrate;

enabling fluid;

a plurality of rotatable elements of a first class; and a plurality of rotatable elements of a second class wherein said plurality of rotatable elements of a first class are defined by a first common response or responses to incident electromagnetic radiation of interest, and wherein said plurality of rotatable elements of a second class are defined by a second common response or responses to said incident electromagnetic radiation of interest, wherein said substrate comprises a cavity-containing matrix having a plurality of cavities of a first class and a plurality of cavities of a second class, wherein said plurality of rotatable elements of a first class are disposed within said plurality of cavities of a first class and in contact with said enabling fluid; and wherein said plurality of rotatable elements of a second class are disposed within said plurality of cavities of a second class and in contact with said enabling fluid, and wherein said plurality of rotatable elements of a first class disposed within said plurality of cavities of a first class have a common first addressing polarity and a common first work function, wherein said plurality of rotatable elements of a second class disposed within said plurality of cavities of a second class have a common second addressing polarity and a common second work function, and wherein said plurality of cavities of a first class and said plurality of cavities of a second class are arranged in a regular, repeating pattern in a substantially single layer.

2. The rotating element sheet material of claim 1 wherein said common first work function is less than said common second work function.

3. The rotating element sheet material of claim 2
wherein said plurality of rotatable elements of a first class have a common first diameter;
wherein said plurality of rotatable elements of a second class have a common second diameter; and
where said common first diameter is less than said common second diameter.

4. Rotating element sheet material comprising:
a substrate;
enabling fluid;
a plurality of rotatable elements of a first class; and
a plurality of rotatable elements of a second class
wherein said plurality of rotatable elements of a first class are defined by a first common response or responses to incident electromagnetic radiation of interest, and
wherein said plurality of rotatable elements of a second class are defined by a second common response or responses to said incident electromagnetic radiation of interest,
wherein said substrate comprises a cavity-containing matrix having a plurality of cavities of a first class and a plurality of cavities of a second class,
wherein said plurality of rotatable elements of a first class are disposed within said plurality of cavities of a first class and in contact with said enabling fluid; and
wherein said plurality of rotatable elements of a second class are disposed within said plurality of cavities of a second class and in contact with said enabling fluid; and
wherein said plurality of rotatable elements of a first class disposed within said plurality of cavities of a first class have a common first addressing polarity and a common first work function,
wherein said plurality of rotatable elements of a second class disposed within said plurality of cavities of a second class have a common second addressing polarity and a common second work function,
wherein said common first work function is less than said common second work function, and
wherein a first aspect area comprises a first subset of said plurality of cavities of a first class and a second subset of said plurality of cavities of a second class, and
wherein a second aspect area comprises a third subset of said plurality of cavities of a second class;
and wherein said first aspect area is a first macroscopic region such that, under the influence of a macroscopic vector field at a first magnitude, said first aspect area exhibits a first macroscopic aspect, and that under the influence of said macroscopic vector field at a second magnitude, said first aspect area exhibits a second macroscopic aspect; and
wherein said second aspect area is a second macroscopic region such that, under the influence of said macroscopic vector field at said second magnitude, said second aspect area exhibits a third macroscopic aspect; and
wherein said first magnitude is between said second work function and said first work function, and said second magnitude is above said second work function.

5. The rotating element sheet material of claim 4
wherein said plurality of rotatable elements of a first class have a common first diameter;
wherein said plurality of rotatable elements of a second class have a common second diameter; and
where said common first diameter is less than said common second diameter.

6. A method of addressing said rotating element sheet material of claim 4,
wherein said method causes a change in a macroscopic aspect of said rotating element sheet material,
said method comprising:
providing said rotating element sheet material;
first introducing a first vector field in a first direction through said first macroscopic region and said second macroscopic region that is greater than said first work function and less than said second work function; and
next introducing a second vector field in said first direction through said first macroscopic region and said second macroscopic region that is greater than said second work function.

7. The method of addressing of claim 6,
wherein said incident electromagnetic energy of interest comprises the wavelengths of visible light.

8. A method of manufacturing rotating element sheet material comprising:
providing a substrate component, wherein said substrate component defines a plurality of microrecesses of a first class and a plurality of microrecesses of a second class;
providing a substrate cover;
providing enabling fluid;
providing a plurality of rotatable elements of a first class; and
providing a plurality of rotatable elements of a second class;
first dispersing said plurality of rotatable elements of a second class to said plurality of microrecesses of a second class, wherein said plurality of rotatable elements of a second class are configured such that they do not settle into microrecess of a first class; and
next dispersing said plurality of rotatable elements of a first class to said plurality of microrecesses of a first class, wherein said plurality of rotatable elements of a first class do not settle into microrecess of a second class occupied by said rotatable elements of a second class;
applying said substrate cover and said enabling fluid to said substrate component containing said dispersed rotatable elements of a first class and said dispersed rotatable elements of a second class, and
wherein said plurality of rotatable elements of a first class disposed within said plurality of microrecesses of a first class have a common first addressing polarity and a common first work function,
wherein said plurality of rotatable elements of a second class disposed within said plurality of microrecesses of a second class have a common second addressing polarity and a common second work function.

9. A method of manufacturing rotating element sheet material comprising:
providing a substrate component, wherein said substrate component defines a plurality of microrecesses of a first class and a plurality of microrecesses of a second class;
providing a substrate cover;
providing enabling fluid;
providing a plurality of rotatable elements of a first class; and
providing a plurality of rotatable elements of a second class;

first dispersing said plurality of rotatable elements of a second class to said plurality of microrecesses of a second class, wherein said plurality of rotatable elements of a second class are configured such that they do not settle into microrecess of a first class;

translationally confining said dispersed rotatable elements of a second class; and next dispersing said plurality of rotatable elements of a first class to said plurality of microrecesses of a first class, wherein said plurality of rotatable elements of a first class do not settle into microrecess of a second class occupied by said rotatable elements of a second class;

applying said substrate cover and said enabling fluid to said substrate component containing said dispersed rotatable elements of a first class and said dispersed rotatable elements of a second class, and wherein said plurality of rotatable elements of a first class disposed within said plurality of microrecesses of a first class have a common first addressing polarity and a common first work function, wherein said plurality of rotatable elements of a second class disposed within said plurality of microrecesses of a second class have a common second addressing polarity and a common second work function.

10. A method of manufacturing rotating element sheet material comprising:

providing a substrate component, wherein said substrate component defines a plurality of microrecesses of a first class and a plurality of microrecesses of a second class;

providing a substrate cover;

providing enabling fluid;

providing a plurality of rotatable elements of a first class; and providing a plurality of rotatable elements of a second class;

wherein said plurality of rotatable elements of a first class have a common first diameter;

wherein said plurality of rotatable elements of a second class have a common second diameter; and where said common first diameter is less than said common second diameter;

first dispersing said plurality of rotatable elements of a second class to said plurality of microrecesses of a second class, wherein said plurality of rotatable elements of a second class are configured such that they do not settle into microrecess of a first class; and next dispersing said plurality of rotatable elements of a first class to said plurality of microrecesses of a first class, wherein said plurality of rotatable elements of a first class do not settle into microrecess of a second class occupied by said rotatable elements of a second class;

applying said substrate cover and said enabling fluid to said substrate component containing said dispersed rotatable elements of a first class and said dispersed rotatable elements of a second class, and wherein said plurality of rotatable elements of a first class disposed within said plurality of microrecesses of a first class have a common first addressing polarity and a common first work function, wherein said plurality of rotatable elements of a second class disposed within said plurality of microrecesses of a second class have a common second addressing polarity and a common second work function.

11. The method of manufacturing rotating element sheet material of claim 8, 9, or 10, wherein said incident electromagnetic energy of interest comprises the wavelengths of visible light.

12. The rotating element sheet material of claim 1, 2, 3, 4, or 5, wherein said incident electromagnetic energy of interest comprises the wavelengths of visible light.

* * * * *